US010073627B2

(12) United States Patent
Ravimohan et al.

(10) Patent No.: US 10,073,627 B2
(45) Date of Patent: Sep. 11, 2018

(54) ADDRESSING, INTERLEAVE, WEAR LEVELING, AND INITIALIZATION SCHEMES FOR DIFFERENT CHIP ENABLES AND MEMORY ARRAYS OF DIFFERENT TYPES

(71) Applicant: SanDisk Technologies Inc., Plano, TX (US)

(72) Inventors: Narendhiran Chinnaanangur Ravimohan, Bangalore (IN); Muralitharan Jayaraman, Bangalore (IN); Vijay Sivasankaran, Bangalore (IN); Krishnamurthy Dhakshinamurthy, Bangalore (IN); Arun Thandapani, Bangalore (IN)

(73) Assignee: SanDisk Technologies LLC, Plano, TX (US)

( * ) Notice: Subject to any disclaimer, the term of this patent is extended or adjusted under 35 U.S.C. 154(b) by 0 days.

(21) Appl. No.: 14/994,641

(22) Filed: Jan. 13, 2016

(65) Prior Publication Data

US 2016/0202910 A1 Jul. 14, 2016

(30) Foreign Application Priority Data

Jan. 13, 2015 (IN) .......................... 126/MUM/2015

(51) Int. Cl.
*G06F 3/06* (2006.01)
*G06F 12/06* (2006.01)
*G06F 12/02* (2006.01)

(52) U.S. Cl.
CPC ............ *G06F 3/061* (2013.01); *G06F 3/0632* (2013.01); *G06F 3/0655* (2013.01); *G06F 3/0688* (2013.01); *G06F 12/0246* (2013.01); *G06F 12/0607* (2013.01); *G06F 2212/7201* (2013.01); *G06F 2212/7208* (2013.01); *G06F 2212/7211* (2013.01)

(58) Field of Classification Search
CPC ............. G06F 12/0607; G06F 12/0246; G06F 2212/50; G06F 2212/7201; G06F 2212/7208
See application file for complete search history.

(56) References Cited

U.S. PATENT DOCUMENTS

| 7,715,255 | B2 | 5/2010 | Tu et al. | |
|---|---|---|---|---|
| 9,594,675 | B2 * | 3/2017 | Tsai | ...................... G06F 12/06 |
| 2008/0086588 | A1 * | 4/2008 | Danilak | ............... G06F 13/385 |
| | | | | 711/103 |
| 2014/0189200 | A1 * | 7/2014 | Gavens | ............... G06F 12/0607 |
| | | | | 711/103 |
| 2014/0189210 | A1 | 7/2014 | Sinclair et al. | |

* cited by examiner

*Primary Examiner* — Gary W. Cygiel
(74) *Attorney, Agent, or Firm* — Brinks Gilson & Lione

(57) ABSTRACT

A non-volatile memory system may include a plurality of dies, where the plurality of dies are configured in a plurality of chip enable groups and at least one of the chip enable groups includes less than a maximum number of dies that may be uniquely identified according to a die selection scheme, where different memory arrays have different capacities and/or include memory elements of different types or technologies, or some combination thereof. One or more virtual die layouts, addressing schemes and mappings, wear leveling schemes, and initialization schemes may be employed for these multi-die configurations.

22 Claims, 15 Drawing Sheets

ND MEMORY ARRAYS OF DIFFERENT
ADDRESSING, INTERLEAVE, WEAR LEVELING, AND INITIALIZATION SCHEMES FOR DIFFERENT CHIP ENABLES AND MEMORY ARRAYS OF DIFFERENT TYPES

CROSS-REFERENCE TO RELATED APPLICATIONS

This application claims priority to Indian Patent Application No. 126/MUM/2015, filed Jan. 13, 2015. The contents of Indian Patent Application No. 126/MUM/2015 are incorporated by reference in their entirety.

BACKGROUND

Non-volatile memory systems may be confined to packaging size requirements or specifications. In order to achieve an increased amount of storage capacity while adhering to these size requirements or specifications, a certain die layout identifying a number of dies, die capacities, and memory types for the dies may be chosen. Some die layouts may be incompatible with an existing initialization process or addressing scheme. Additionally, the chosen die layout may provide degraded endurance if implemented with existing storage management architectures. As such, it may be desirable to establish an addressing scheme, a wear leveling scheme, and/or an initialization process for the chosen die layout, particularly ones that may be compatible with the system's existing read-only memory (ROM) architecture.

Overview

Embodiments of the present invention are defined by the claims, and nothing this section should be taken as a limitation on those claims.

In one embodiment, a non-volatile memory system may include non-volatile memory comprising a plurality of physically present memory dies configured in a plurality of chip enable groups, where a chip enable group of the plurality of chip enable groups comprises a number of physically present memory dies that is less than a maximum number of memory dies allowed to be uniquely identified under a die selection scheme. The non-volatile memory system may also include a controller in communication with the non-volatile memory. The controller may be configured to select the plurality of physically present memory dies for communication according to the die selection scheme, and upon completing an initialization process, maintain an address mapping that maps addresses to storage locations of the non-volatile memory according to a virtual die layout that identifies the chip enable group as comprising the maximum number of memory dies.

In a second embodiment, a method of performing an initialization process of a non-volatile memory system comprising non-volatile memory, where the non-volatile memory comprises a plurality of physically present memory dies, may include: receiving, with a controller of the non-volatile memory system, an initialization command from a host system; in response to receiving the initialization command, initializing, with a read-only memory (ROM) module of the controller, an initial set of the physically present memory dies, wherein a number of physically present memory dies of the first set is less than a total number of the physically present memory dies; retrieving, with a random access memory (RAM) module of the controller, firmware stored in the non-volatile memory; and in response to retrieving the firmware, initializing, with the RAM module, a remaining set of the physically present memory dies.

In a third embodiment, a non-volatile memory system may include non-volatile memory comprising a plurality of memory dies, wherein each memory die of the plurality of memory dies has an associated capacity. The non-volatile memory system may also include a controller configured to perform write operations across the plurality of memory dies according to a wear leveling scheme that is based on capacity ratios associated with the plurality of memory dies. Each capacity ratio comprises a ratio of a capacity of an associated one of the plurality of memory dies to a largest capacity among the plurality of memory dies. In addition, among the capacity ratios, a first capacity ratio associated with at least one first memory die of the plurality of memory dies is less than a second capacity ratio associated with at least one second memory die of the plurality of memory dies.

Other embodiments are possible, and each of the embodiments can be used alone or together in combination. Accordingly, various embodiments will now be described with reference to the attached drawings.

BRIEF DESCRIPTION OF THE DRAWINGS

The accompanying drawings, which are incorporated in and constitute a part of this specification illustrate various aspects of the invention and together with the description, serve to explain its principles. Wherever convenient, the same reference numbers will be used throughout the drawings to refer to the same or like elements.

DETAILED DESCRIPTION

The following embodiments describe exemplary virtual die layouts, metablock addressing schemes and mappings, interleave schemes, wear leveling schemes, and initialization processes that may be employed by a controller of a non-volatile memory system having multiple chip enable groups, where at least one of the chip enable groups does not include a maximum number of dies that are allowed to be uniquely identified under a die selection scheme employed by the controller, and/or at least two dies include memory arrays of different types or technologies. Before turning to these and other embodiments, the following paragraphs provide a discussion of exemplary non-volatile memory systems and storage modules that can be used with these embodiments. Of course, these are just examples, and other suitable types of non-volatile memory systems and/or storage modules can be used.

Figure 1A:
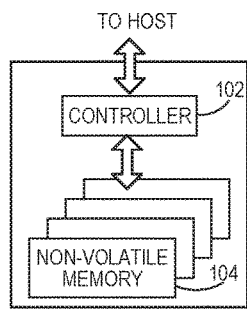
FIG. 1A is a block diagram of an exemplary non-volatile memory system.

FIG. 1A is a block diagram illustrating a non-volatile memory system 100. The non-volatile memory system 100 may include a controller 102 and non-volatile memory that may be made up of one or more non-volatile memory die 104. As used herein, the term die refers to the set of non-volatile memory cells, and associated circuitry for managing the physical operation of those non-volatile memory cells, that are formed on a single semiconductor substrate. The controller 102 may interface with a host system and transmit command sequences for read, program, and erase operations to the non-volatile memory die 104.

The controller 102 (which may be a flash memory controller) can take the form of processing circuitry, a microprocessor or processor, and a computer-readable medium that stores computer-readable program code (e.g., software or firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. (Alternatively, the host can provide the physical address). The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

The interface between the controller 102 and the non-volatile memory die 104 may be any suitable flash interface, such as Toggle Mode 200, 400, or 800. In one embodiment, the memory system 100 may be a card based system, such as a secure digital (SD) or a micro secure digital (micro-SD) card. In an alternate embodiment, the system 100 may be part of an embedded memory system.

Although in the example illustrated in FIG. 1A, the non-volatile memory system 100 may include a single channel between the controller 102 and the non-volatile memory die 104, the subject matter described herein is not limited to having a single memory channel. For example, in some NAND memory system architectures, 2, 4, 8 or more NAND channels may exist between the controller and the NAND memory dies 104, depending on controller capabilities. In any of the embodiments described herein, more than a single channel may exist between the controller and the memory dies 104, even if a single channel is shown in the drawings.

Figure 1B:
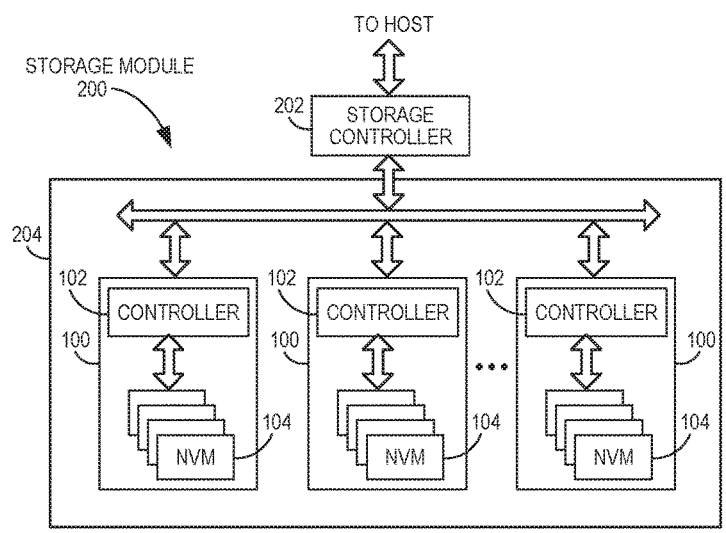
FIG. 1B is a block diagram of a storage module that includes a plurality of non-volatile memory systems.

FIG. 1B illustrates a storage module 200 that includes plural non-volatile memory systems 100. As such, the storage module 200 may include a storage controller 202 that interfaces with a host and with a storage system 204, which includes a plurality of non-volatile memory systems 100. The interface between the storage controller 202 and non-volatile memory systems 100 may be a bus interface, such as a serial advanced technology attachment (SATA), a peripheral component interface express (PCIe) interface, an embedded MultiMediaCard (eMMC) interface, a SD interface, or a Universal Serial Bus (USB) interface, as examples. The storage system 200, in one embodiment, may be a solid state drive (SSD), such as found in portable computing devices, such as laptop computers and tablet computers, and mobile phones.

Figure 1C:
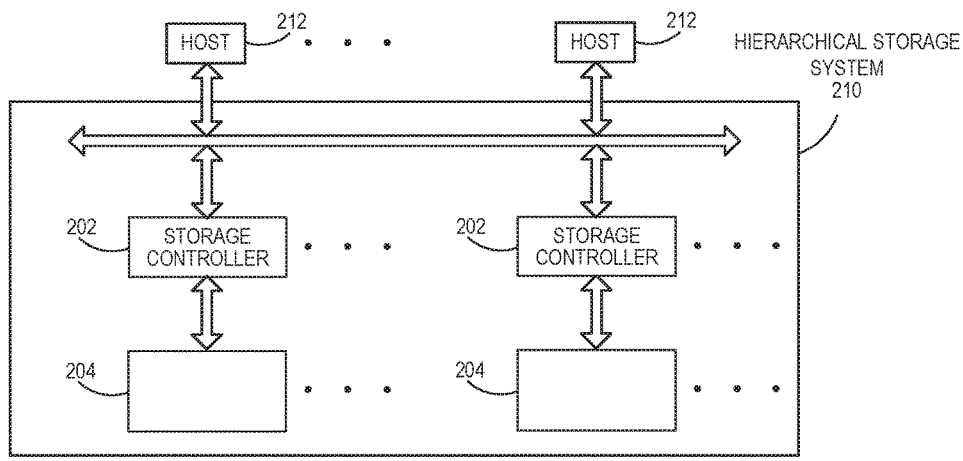
FIG. 1C is a block diagram of a hierarchical storage system.

FIG. 1C is a block diagram illustrating a hierarchical storage system 210. The hierarchical storage system 210 may include a plurality of storage controllers 202, each of which control a respective storage system 204. Host systems 212 may access memories within the hierarchical storage system 210 via a bus interface. Example bus interfaces may include a non-volatile memory express (NVMe), a fiber channel over Ethernet (FCoE) interface, an SD interface, a USB interface, a SATA interface, a PCIe interface, or an eMMC interface as examples. In one embodiment, the storage system 210 illustrated in FIG. 1C may be a rack mountable mass storage system that is accessible by multiple host computers, such as would be found in a data center or other location where mass storage is needed.

Figure 2A:
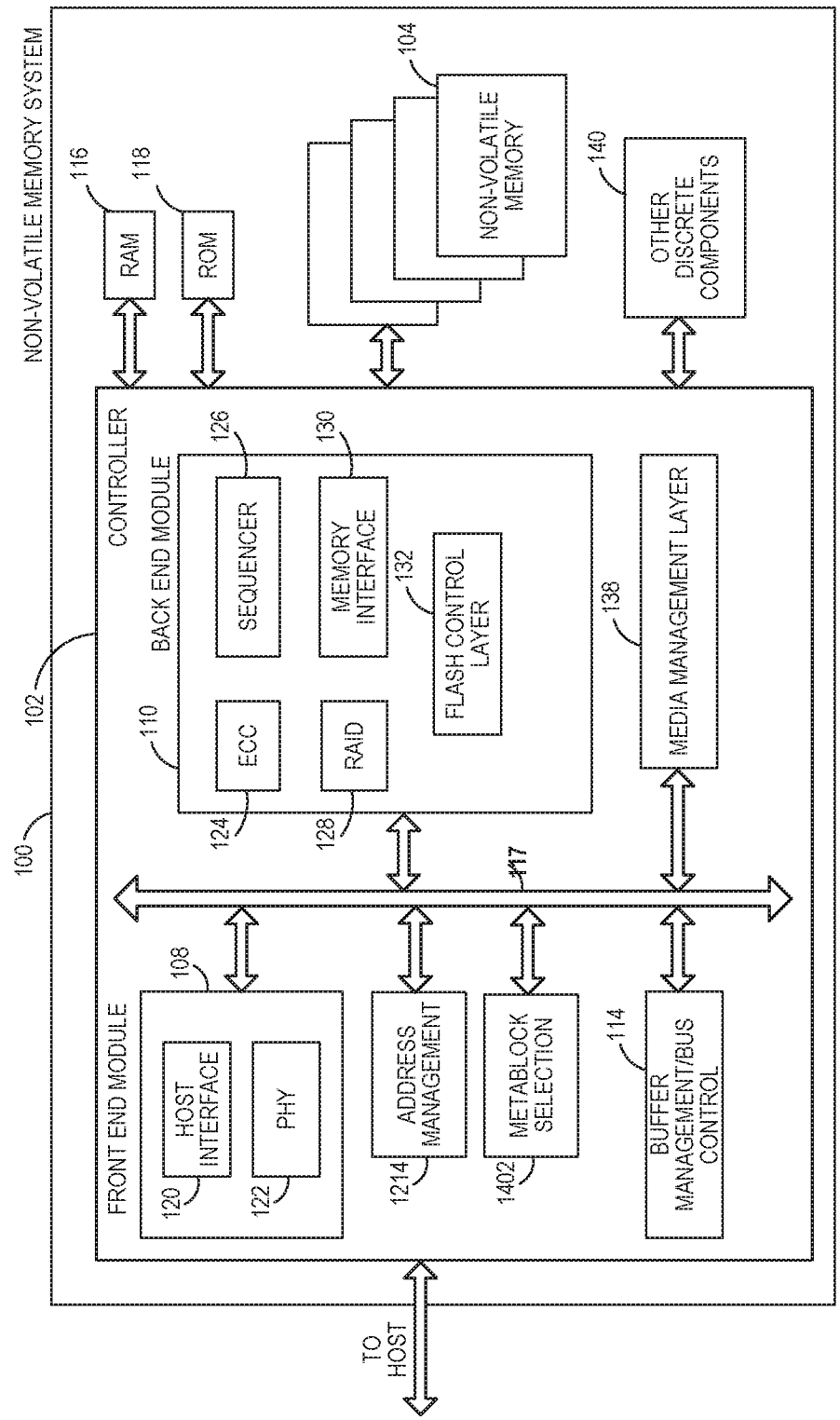
FIG. 2A is a block diagram of exemplary components of a controller of the non-volatile memory system of FIG. 1A.

FIG. 2A is a block diagram illustrating exemplary components of the controller 102 in more detail. The controller 102 may include a front end module 108 that interfaces with a host, a back end module 110 that interfaces with the one or more non-volatile memory die 104, and various other modules that perform various functions of the non-volatile memory system 100. In general, a module may be hardware or a combination of hardware and software. For example, each module may include an application specific integrated circuit (ASIC), a field programmable gate array (FPGA), a circuit, a digital logic circuit, an analog circuit, a combination of discrete circuits, gates, or any other type of hardware or combination thereof. In addition or alternatively, each module may include memory hardware that comprises instructions executable with a processor or processor circuitry to implement one or more of the features of the module. When any one of the module includes the portion of the memory that comprises instructions executable with the processor, the module may or may not include the processor. In some examples, each module may just be the portion of the memory that comprises instructions executable with the processor to implement the features of the corresponding module without the module including any other hardware. Because each module includes at least some hardware even when the included hardware comprises software, each module may be interchangeably referred to as a hardware module.

The controller 102 may include a buffer manager/bus controller module 114 that manages buffers in random access memory (RAM) 116 and controls the internal bus arbitration for communication on an internal communications bus 117 of the controller 102. A read only memory (ROM) 118 may store and/or access system boot code, as described in further detail below. Although illustrated in FIG. 2A as located separately from the controller 102, in other embodiments one or both of the RAM 116 and the ROM 118 may be located within the controller 102. In yet other embodiments, portions of RAM 116 and ROM 118 may be located both within the controller 102 and outside the controller 102. Further, in some implementations, the controller 102, the RAM 116, and the ROM 118 may be located on separate semiconductor dies.

In addition, for purposes of the present description, each of the RAM 116 and the ROM 118 may be described below as performing functions or operations. For such description, the RAM 116 and/or the ROM 118 may be modules that, in addition to including memory storing software or firmware, may further include processor circuitry configured to execute the software or firmware stored in their respective memory to perform the functions or operations.

Additionally, the front end module 108 may include a host interface 120 and a physical layer interface (PHY) 122 that provide the electrical interface with the host or next level storage controller. The choice of the type of the host interface 120 can depend on the type of memory being used. Examples types of the host interface 120 may include, but are not limited to, SATA, SATA Express, SAS, Fibre Channel, USB, PCIe, and NVMe. The host interface 120 may typically facilitate transfer for data, control signals, and timing signals.

The back end module 110 may include an error correction controller (ECC) engine 124 that encodes the data bytes received from the host, and decodes and error corrects the data bytes read from the non-volatile memory 104. The back end module 110 may also include a command sequencer 126 that generates command sequences, such as program, read, and erase command sequences, to be transmitted to the non-volatile memory die 104. Additionally, the back end module 110 may include a RAID (Redundant Array of Independent Drives) module 128 that manages generation of RAID parity and recovery of failed data. The RAID parity may be used as an additional level of integrity protection for the data being written into the non-volatile memory system 100. In some cases, the RAID module 128 may be a part of the ECC engine 124. A memory interface 130 provides the command sequences to the non-volatile memory die 104 and receives status information from the non-volatile memory die 104. In one embodiment, the memory interface 130 may be a double data rate (DDR) interface, such as a Toggle Mode 200, 400, or 800 interface. A flash control layer 132 controls the overall operation of back end module 110.

Additional modules of the non-volatile memory system 100 illustrated in FIG. 2A may include a media management layer 138, which performs wear leveling of memory cells of the non-volatile memory die 104. The non-volatile memory system 100 may also include other discrete components 140, such as external electrical interfaces, external RAM, resistors, capacitors, or other components that may interface with controller 102. In alternative embodiments, one or more of the RAID module 128, media management layer 138 and buffer management/bus controller 114 are optional components that may not be necessary in the controller 102.

Additional modules of the non-volatile memory system 100 illustrated in FIG. 2A may also include an address management module 1214 and a metablock selection module 1402, which are described in further detail below with respect to FIGS. 12 and 14, respectively. Each of these modules 1214 and 1402 are shown as modules separate from the other modules of the non-volatile memory system 100, although in other configurations, the address management module 1214 and/or the metablock selection module 1402 may be part of any of the other modules.

Figure 2B:
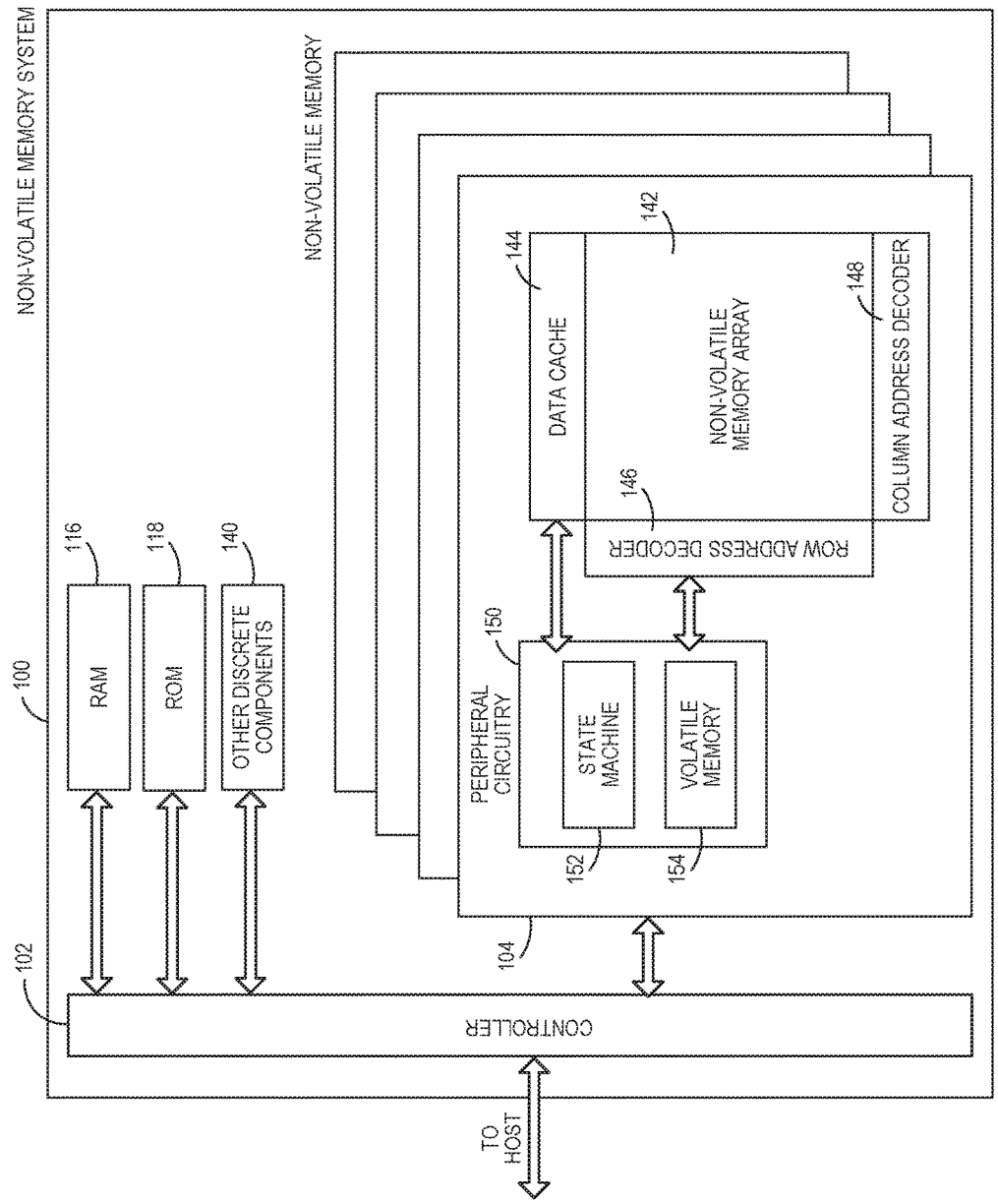
FIG. 2B is a block diagram of exemplary components of a non-volatile memory die of the non-volatile memory system of FIG. 1A.

FIG. 2B is a block diagram illustrating exemplary components of the non-volatile memory die 104 in more detail. The non-volatile memory die 104 may include a non-volatile memory array 142. The non-volatile memory array 142 may include a plurality of non-volatile memory elements or cells, each configured to store one or more bits of data. The non-volatile memory elements or cells may be any suitable non-volatile memory cells, including NAND flash memory cells and/or NOR flash memory cells in a two dimensional and/or three dimensional configuration. The memory cells may take the form of solid-state (e.g., flash) memory cells and can be one-time programmable, few-time programmable, or many-time programmable. In addition, the memory elements or cells may be configured as single-level cells (SLCs) that store a single bit of data per cell, multi-level cells (MLCs) that store multiple bits of data per cell, or combinations thereof. For some example configurations, the multi-level cells (MLCs) may include triple-level cells (TLCs) that store three bits of data per cell.

Whether a memory element is a SLC or a MLC may depend on the number of bits programmed or written into the memory element and/or the number of bits the memory element is storing. For example, if a memory element is storing a single bit of data, then the memory element may be configured as a SLC. Alternatively, if a memory element is storing multiple (two or more) bits of data, then the memory element may be configured as a MLC. Accordingly, each of the memory elements may be configured or programmed in a SLC mode or a MLC mode, as determined by how many bits each of the memory elements is storing. Further, for some example configurations, the mode in which each of the memory elements is configured may be dynamic. For example, a memory element may be programmed as a SLC and subsequently programmed as a MLC, or vice versa. For other example configurations, the modes may be static, in that a mode in which a memory element is configured or programmed may not change.

Additionally, a flash memory cell may include in the array 142 a floating gate transistor (FGT) that has a floating gate and a control gate. The floating gate is surrounded by an insulator or insulating material that helps retain charge in the floating gate. The presence or absence of charges inside the floating gate may cause a shift in a threshold voltage of the FGT, which is used to distinguish logic levels. That is, each FGT's threshold voltage may be indicative of the data stored in the memory cell. Hereafter, FGT, memory element and memory cell may be used interchangeably to refer to the same physical entity.

The memory cells may be disposed in the memory array 142 in accordance with a matrix-like structure of rows and columns of memory cells. At the intersection of a row and a column is a FGT (or memory cell). A column of FGTs may be referred to as a string. FGTs in a string or column may be electrically connected in series. A row of FGTs may be referred to as a page. Control gates of FGTs in a page or row may be electrically connected together.

The memory array 142 may also include wordlines and bitlines connected to the FGTs. Each page of FGTs is coupled to a wordline. In particular, each wordline may be coupled to the control gates of FGTs in a page. In addition, each string of FGTs may be coupled to a bitline. Further, multiple wordlines may span across a single string, and the number of FGTs in a string may be equal to the number of pages in a block.

Figure 3:
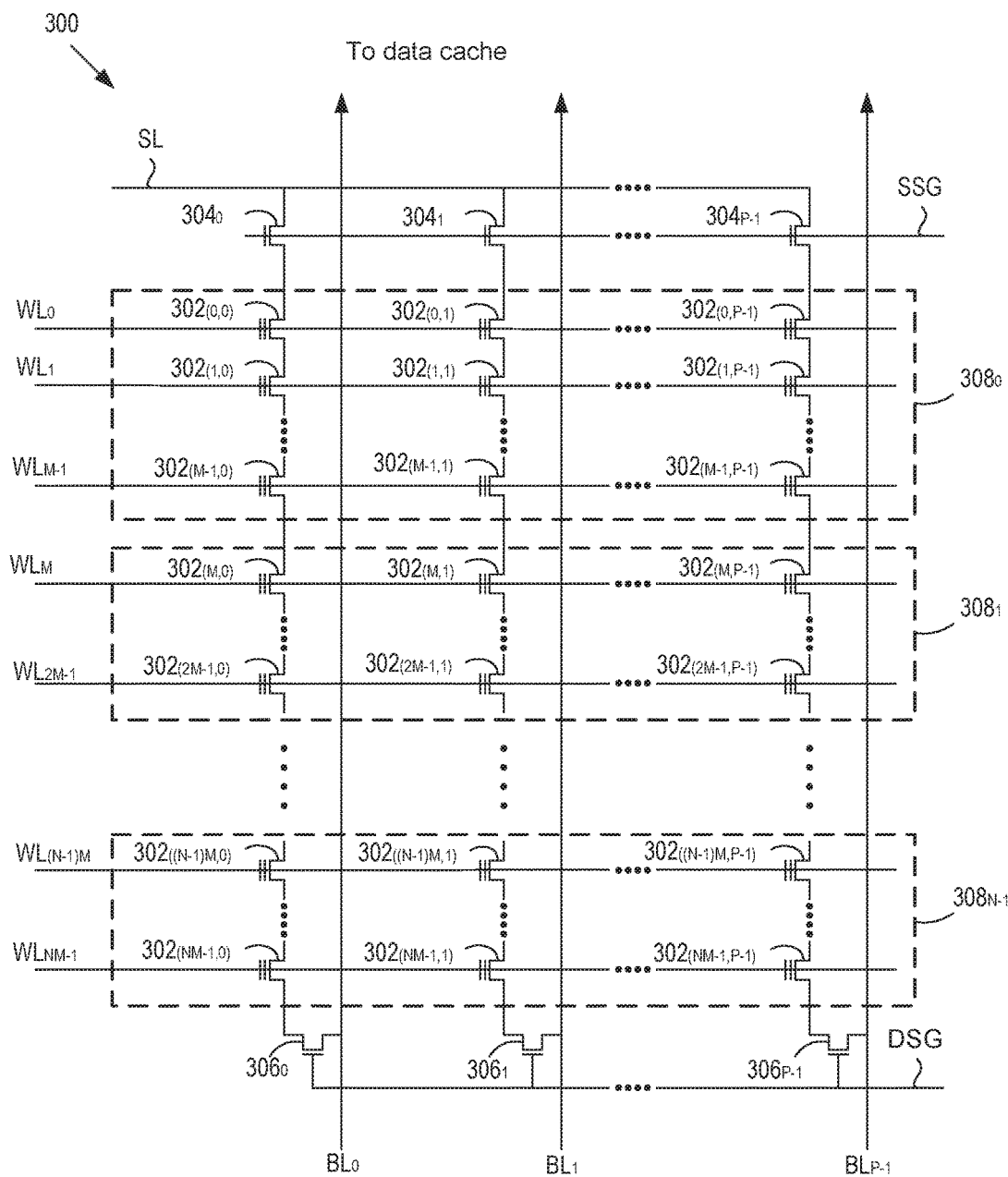
FIG. 3 is a circuit schematic diagram of an exemplary NAND-type flash memory array.

FIG. 3 is a circuit schematic diagram of at least a portion of an exemplary NAND-type flash memory array 300, which may be representative of at least a portion of the memory array 142. The memory array portion 300 may include a P-number of series-connected strings of (N times M) FGTs, each coupled to one of a P-number of bitlines $BL_1$ to $BL_{P-1}$, where N is the number of blocks $308_0$ to $308_{N-1}$ in the memory array 300, and M is the number of pages of FGTs coupled to wordlines WL in each of the N-number of blocks $308_0$ to $308_{N-1}$.

To sense data from the FGTs, a page of FGTs and a corresponding wordline may be selected, and current sensing of bitlines may be employed to determine whether a floating gate of a FGT in the selected page contains charge or not. Current that flows through a string may flow from a source line SL, through the string, to a bitline BL to which the string is coupled. The string may be coupled to the source line SL via a source select transistor, and may be coupled to its associated bitline BL via a drain select transistor. For example, a first string of FGTs $302_{(0,0)}$ to $302_{(NM-1,0)}$ may be coupled to the source line SL via a source select transistor $304_0$ that is connected to the source line SL, and may be coupled to its associated bitline $BL_0$ via a drain select transistor $306_0$. The other strings may be similarly coupled. Switching of source select transistors $304_0, 304_1, \ldots, 304_{P-1}$ may be controlled using a source select gate bias line SSG that supplies a source select gate bias voltage $V_{SSG}$ to turn on an off the source select transistors $304_0, 304_1, \ldots, 304_{P-1}$. Additionally, switching of drain select transistors $306_0, 406_1, \ldots, 306_{P-1}$ may be controlled using a drain select gate bias line DSG that supplies a drain select gate bias voltage $V_{DSG}$ to turn on and off the drain select transistors $306_0, 306_1, \ldots, 306_{P-1}$.

In addition, the memory array 142 and/or plurality of memory arrays 142 spanning multiple memory dies 104 may have an organizational arrangement or hierarchy under which memory elements or cells of the memory array 142 and/or multiple memory arrays 142 of multiple memory dies 104 are organized. The controller 102 may be configured to store and access data in accordance with the organizational arrangement or hierarchy.

Figure 4:
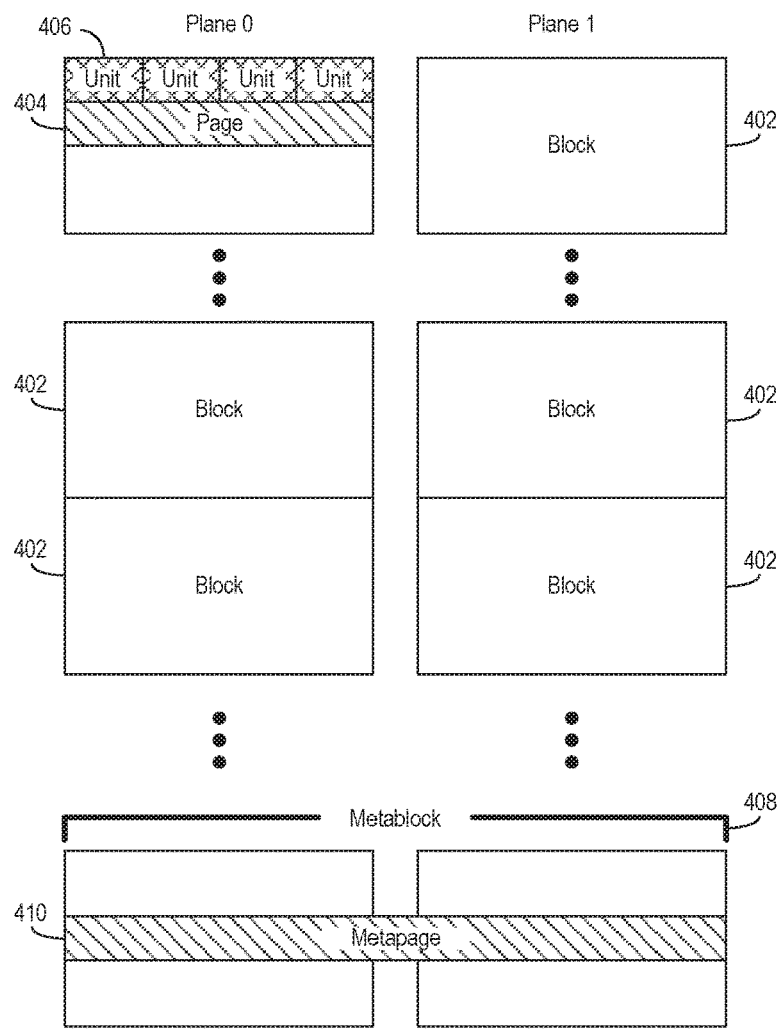
FIG. 4 is a block diagram of an example organizational arrangement or hierarchy of a memory array for flash memory.

FIG. 4 is a block diagram of an example organizational arrangement or hierarchy of a memory array 142 for flash memory. As mentioned, for flash memory, the memory cells may be divided or organized into blocks 402, and each block 402 may further be divided into a number of pages 404. Each block 402 may contain the minimum number of memory elements that may be erased together. In addition, each page 404 may be a unit of sensing in the memory array 142. Each individual page 404 may further be divided into segments or units 606, with each segment or unit 406 containing the fewest number of memory cells that may be written to at one time as a basic programming operation. Data stored in a segment or unit of memory cells—referred to as a flash memory unit (FMU), an ECC page, or a codeword—may contain the smallest amount of data that is written at one time during a basic programming operation and/or the smallest amount of data that can be encoded or decoded by the ECC engine 124 during a single encoding or decoding operation. The pages 404 may be divided into the same number of segments or units. Example numbers of segments or unit may be four or eight, although other numbers are possible. In general, data may be stored in blocks and pages of memory elements non-contiguously (randomly) or contiguously.

In addition, the organizational arrangement or hierarchy may include one or more planes in which each of the blocks 402 may be configured. Generally, a plane include a "column" of blocks 402, although other configurations may be possible. A single memory array 142 may include a single plane or multiple planes. The example arrangement shown in FIG. 4 includes two planes, Plane 0 and Plane 1. Data stored in different planes may be sensed separately or independently.

Additionally, the organizational arrangement or hierarchy may include metablocks 408 and metapages 410. As explained in further detail below, a metablock address or number identifying a metablock may be mapped to and/or correspond to a logical address (e.g., a logical group number) provided by a host. A metablock 408 and a metapage 410 may span or be distributed across a respective single block and page in a single plane, or alternatively, may span or be distributed across respective multiple blocks and multiple pages across multiple planes. FIG. 4 shows the metablock 408 and the metaplane 410 spanning across two planes, Plane 0 and Plane 1. Depending on the organizational arrangement, metablocks 408 and metapages 410 spanning across multiple planes may span across only those planes of a single memory die 104, or alternatively may span across multiple planes located of multiple memory dies 104.

As described in further detail below, the controller 102 may employ an interleave scheme for writing data into the memory dies 104. The interleave scheme may determine, at least in part, sizes of the metablocks 408. In a particular example, the interleave scheme may include a die component and a plane component. The die component may identify the number of dies 104 over which the metablock 408 spans, and the plane component may identify the number of planes per die over which the metablock 408 spans. In general, if the metablock 408 spans over only a single die, then the plane component of the interleave scheme may specify that a metablock 408 spans either over only one of the planes (e.g., only Plane 0 or Plane 1) of the die 104, or alternatively both planes (e.g., both Plane 0 and Plane 1) of the die 104. Alternatively, if the metablock 408 spans over multiple dies, then the plane component may specify that the metablock spans over both planes of each of the dies. As non-limiting interleave scheme examples, a one-die, one-plane (1D 1P) interleave scheme specifies that a metablock 408 spans a single die in a single plane; a one-die, two-plane (1D 2P) interleave scheme specifies that a metablock 408 spans both planes in a single die; a two-die, two-plane (2D 2P) interleave scheme specifies that a metablock 408 spans two dies and both planes in each of the two dies; and a three-die, two-plane (3D 2P) interleave scheme specifies that a metablock 408 spans three dies and both planes in each of the three dies. Other interleave schemes, including those specifying that the metablocks span more than three dies, may be possible.

The die and plane components of the interleave scheme may indicate the number of blocks included in a metablock 408, or otherwise stated, may indicate the number of blocks 402 over which a metablock 408 spans. As examples, the 1D 1P interleave scheme indicates that a metablock 408 spans a single block 402; the 1D 2P interleave scheme indicates that a metablock 408 spans two blocks 402; the 2D 2P interleave scheme indicates that a metablock 408 spans four blocks 402; and the 3D 2P interleave scheme indicates that a metablock 408 spans six blocks 402. Further, as described in further detail below, each block 402 may have an associated size in terms of bits or bytes, depending on the technology of the memory elements. As such, a metablock size in terms of bits or bytes may be the number of blocks 402 over which the metablock 408 spans as indicated by the interleave scheme, multiplied by the number of bits or bytes in those blocks 402.

Referring back to FIG. 2B, the non-volatile memory die 104 may further include a page buffer or data cache 144 that caches data that is sensed from and/or that is to be programmed to the memory array 142. The non-volatile memory die 104 may also include a row address decoder 146 and a column address decoder 148. The row address decoder 146 may decode a row address and selects a particular wordline in the memory array 142 when reading or writing data to/from the memory cells in the memory array 142. The column address decoder 150 may decode a column address and selects a particular group of bitlines in the memory array 142 to be electrically coupled to the data cache 144.

In addition, the non-volatile memory die 104 may include peripheral circuitry 150. The peripheral circuitry 150 may include a state machine 152 that provides status information to the controller 102. Other functionality of the state machine 152 is described in further detail below. The peripheral circuitry 150 may also include volatile memory 154. An example configuration of the volatile memory 154 may include latches, although other configurations are possible.

A host and the non-volatile memory system 100 may use different addressing schemes for managing the storage of data. For example, when a host wants to write data to the non-volatile memory system 100, the host may assign a logical address (also referred to as a logical block address (LBA)) to the data. Similarly, when the host wants to read data from the non-volatile memory system 100, the host may identify the data it wants read by the logical address. The host may utilize a logical addressing scheme in which a host file system maintains a logical address range for all LBAs assigned or recognized by the host. In addition, for some example configurations, the host may address data in units of logical sectors. Accordingly, host read and write requests may be requests to read and write a segment comprising a string of logical sectors of data with contiguous addresses.

In contrast to the host's logical addressing scheme, the non-volatile memory system 100 may store and access data according to a physical addressing scheme that uses physical addresses different from the logical addresses assigned by the host to store and access data. To coordinate the host's logical addressing scheme with the non-volatile memory system's physical addressing scheme, the non-volatile memory system 100 may perform address translation in which the non-volatile memory system 100 translates a logical address included in a host request to a physical address for storage or retrieval of data. As previously described, the memory array 142 may be organized or arranged into metablocks. Accordingly, when the non-volatile memory 100 performs address translation, the physical address that the non-volatile memory system 100 determines may identify a metablock, a plurality of metablocks, and/or physical sectors within a metablock, at which the data is stored.

Figure 5:
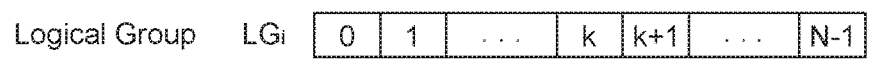
FIG. 5 is a schematic diagram of an example mapping between logical groups and metablocks.
Figure 5:
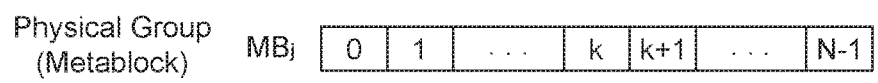
Figure 5:
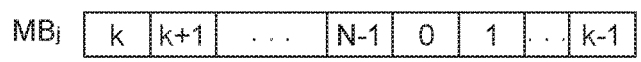

For some example configurations, the logical addresses (LBAs) may be grouped into logical groups (LGs), and the logical groups may be mapped to the metablocks. FIG. 5 shows a schematic diagram of the mapping between logical groups (LG) and metablocks (MB). Each logical group may be mapped to a unique metablock. Accordingly, as shown in FIG. 5, a metablock may have a N-number of physical sectors for storing N-logical sectors of data associated with a logical group. For some example configurations, the logical sectors of data may be stored in the physical sectors in contiguous and sequential logical order 0, 1, . . . N−1. Alternatively, N logical sectors of data may be stored randomly or discontinuously in N physical sectors of a metablock.

In addition, for some example configurations where data is stored contiguously, there may be an offset between the lowest address of a logical group and the lowest address of the metablock to which it is mapped. In that case, logical sector addresses may wrap around as a loop from the bottom back to the top of the logical group within the metablock. For example, as shown in the bottom diagram of FIG. 5, a metablock $MB_j$ may store data associated with a logical sector k in its first physical sector 0. When the last logical sector N−1 is reached, the logical sectors may wrap around such that the first logical sector 0 is stored contiguously and sequentially after logical sector 0, and the logical sector k−1 is stored in the last physical sector N−1. A page tag may be used to identify any offset, such as by identifying the starting logical sector address of the data stored in the first physical of the metablock.

In order to keep track of where in the non-volatile memory system 100 data is stored, the non-volatile memory system 100 may maintain a directory system that maps relationships or associations between logical addresses and metablock addresses. The directory system may include one or more address data structures (such as tables, listings, logs, or databases as examples) that track and identify the logical-physical address relationships or mappings that the controller 102 may access to determine where in the non-volatile memory system 100 the most recent version of the data is stored. The address data structures may include a primary address data structure (also referred to as a Group Address Table (GAT)) that provides a primary logical-physical address mapping for logical addresses included in the logical address range recognized by the host system 101. Various configurations of the mapping for the GAT are possible. In one example configuration for flash technology, the GAT keeps track of logical-physical address mapping between logical groups of logical sectors and corresponding metablocks. The GAT includes an entry for each logical group, ordered sequentially according to logical addresses. In addition, the GAT may be organized into a plurality of GAT pages, with each GAT page including entries identifying a metablock address for every logical group. For some example configurations, the address data structures may include at least one secondary address data structure in addition to the GAT. The at least one secondary address data structure may provide logical-physical address mapping for data fragments, may track changes or updates to where data is stored, or some combination thereof. One example secondary address data structure, referred to as GAT Delta, may track changes to entries and/or include a listing of changed entries in the mappings of the GAT. When data is re-written, the new version of the data may be written to another part of the non-volatile memory system 100, such as in an update block. GAT Delta may map data stored in the update blocks with associated logical groups. For some example configurations, GAT Delta may be part of a Master Index Page (MIP) that, in addition to GAT Delta, includes a Free Block List (FBL) and/or the GAT. The Free Block List may be a list that identifies blocks that are available for storage of data (e.g., for allocation as an update block) and that may be later mapped to logical groups. Other secondary address data structures may be possible.

The metablock addresses that are mapped to the logical addresses in the address data structures may be abstract physical addresses in that they do not directly identify an actual physical location in the memory dies 104 where the data is located. To identify an actual physical location, the non-volatile memory system 100, and in particular the sequencer 126, may perform a subsequent address translation that converts the abstract metablock address obtained from the address data structure to an actual physical address where the data is stored. An example actual physical address may identify a particular memory die 104, along with a block, a page, and a column within the particular memory die 104 where the data is stored.

In addition, for a non-volatile memory system 100 that includes multiple memory dies 104, the metablock addresses that are mapped to the logical addresses in the address data structures may be numbered or otherwise formatted in accordance with a multi-die metablock addressing scheme that spans across the multiple memory dies 104. Each metablock in the plurality of memory dies 104 may be mapped to or assigned a metablock number in accordance with the multi-die metablock addressing scheme.

The metablock addresses assigned to the metablocks under the multi-die metablock addressing scheme may not directly identify the die or the metablock of that die in which the data is stored. In order to determine an actual physical address, the non-volatile memory system 100 may maintain a metablock mapping corresponding to the multi-die metablock addressing scheme that maps metablock addresses under the multi-die metablock addressing scheme to metablocks of particular dies.

Figure 6:
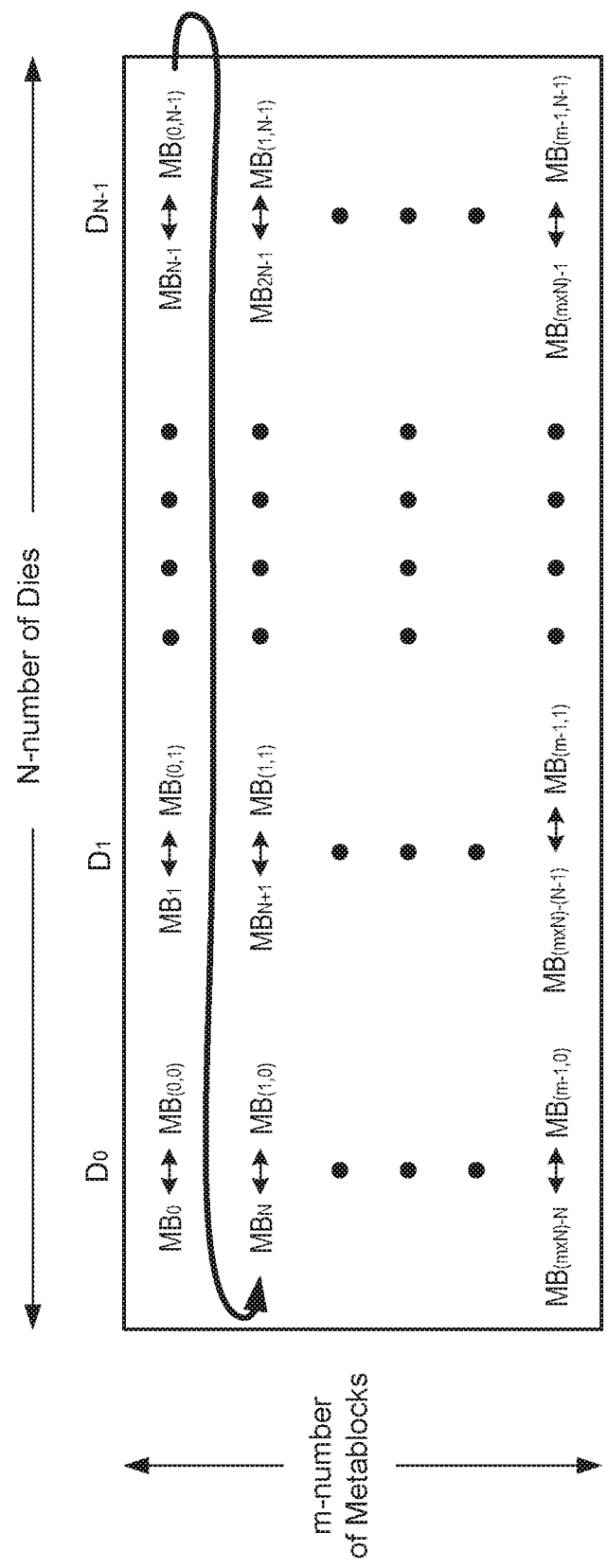
FIG. 6 is a schematic diagram of an example metablock mapping for an N-number of memory dies.

FIG. 6 shows a schematic diagram of an example metablock mapping for an N-number of memory dies 104. The example metablock mapping shown in FIG. 6 may correspond to a multi-die metablock addressing scheme for a one-die two-plane (1D 2P) interleave scheme in which a single metablock spans two blocks (or two planes) in a single die. Accordingly, metablock numbers may be assigned on a die-by-die basis, in which a next metablock number may be assigned to a next metablock in a next memory die.

In further detail, as shown in FIG. 6, the N-number of memory dies may span from a first memory die $D_0$ to an Nth memory die $D_{N-1}$. In addition, each memory die may include an m-number of metablocks. The multi-die metablock addressing scheme may identify consecutive metablock address numbers as being assigned to metablocks located in different memory dies 104. In addition, the metablocks of the different memory dies $D_0$ to $D_{N-1}$ may be configured in rows such that a first row includes the first metablocks of each of the memory dies $D_0$ to $D_{N-1}$, a second row includes the second metablocks of each of the memory dies $D_0$ to $D_{N-1}$, and so on. The metablock numbering under the multi-die metablock addressing scheme may move sequentially from row to row, starting with the first row and ending with the last or mth row. Further, metablock numbers may be assigned within a row in a sequential manner that corresponds with the order in which the dies are assigned or identified. Accordingly, a first metablock number of the multi-die metablock addressing scheme, $MB_0$, may be mapped or assigned to a first metablock $MB_{(0,0)}$ of the first die $D_0$, a second metablock number of the multi-die metablock addressing scheme, $MB_1$, may be mapped or assigned to a first metablock $MB_{(0,1)}$ of the second die $D_1$, and may continue such that an Nth metablock number of the multi-die metablock addressing scheme may be mapped or assigned to the first metablock $MB_{(0,N-1)}$ of the Nth die $D_{N-1}$.

When the last metablock in a row is assigned a number, the metablock numbering under the multi-die metablock addressing scheme may move to a next row. For some example schemes, as shown in FIG. 6, metablock numbers may be assigned in a next row in the same order as they are assigned in the prior row. Accordingly, after the last or Nth metablock in the first row is assigned metablock number $MB_{N-1}$, metablock numbering may move to the second row, and the first metablock in the second row that is assigned a metablock number may be in the same die as the first metablock in the first row that was assigned a metablock number. In this case, the (N+1)th metablock number of the multi-die metablock addressing scheme, $MB_N$, may be mapped or assigned to a second metablock $MB_{(1,0)}$ of the first die $D_0$. Metablock numbering may then proceed in the second row such that the (N+2)th metablock number of the multi-die metablock addressing scheme, $MB_{N+1}$, may be mapped or assigned to a second metablock $MB_{(1,1)}$ of the second die $D_1$, and so on. Metablock mapping may proceed in this fashion until a last or (m×N)th metablock number of the multi-die metablock addressing scheme, $MB_{(m \times N)-1}$, is mapped or assigned to a last or (m−1)th metablock $MB_{((m-1),(N-1))}$ of the Nth die $D_{N-1}$. Other multi-die metablock addressing schemes may be possible. For example, rather than assign metablock numbers for each row in the same sequential order, metablock numbering may proceed in a serpentine fashion from row to row such that next rows are assigned metablock numbers in a reverse order as they were assigned to the prior row.

Similar multi-die metablock addressing schemes and corresponding metablock mappings may be employed for interleave schemes other than one-die, two-plane (1D 2P). To illustrate, under a two-die two-plane (2D 2P) interleave scheme, a metablock may span four blocks over two dies. Accordingly, a next metablock number may be assigned to a next metablock every two dies. A last metablock number assigned in a row may be assigned to a last metablock spanning the last two dies (i.e., $D_{N-2}$ and $D_{N-1}$). After the last metablock spanning the last two dies in a row is assigned a metablock number, a first metablock in a next row spanning the first two dies ($D_0$ and $D_1$) may be assigned a next metablock number.

In addition, where the non-volatile memory system 100 includes a plurality of memory dies 104, each of the memory dies 104 may be configured in one of a plurality of chip enable groups. Memory dies 104 of the same chip enable group may be configured to receive and/or be enabled by the same chip enable signal sent from the controller 102. Conversely, memory dies 104 that are not configured in that chip enable group may be configured not to receive and/or not be enabled by that chip enable signal, and instead may be configured to receive and/or be enabled by a different chip enable signal from the controller 102. Upon being enabled by a chip enable signal, a memory die may ready and able to receive and process requests or commands, such as read, write, erase, and status commands, received from the controller 102. Accordingly, in order to have a memory die 104 be enabled to process a command that the controller 102 wants to send to it, the controller 102 may be configured to send a chip enable signal in order to enable that memory die 104. Conversely, if a memory die 104 is not enabled in response to a chip enable signal, then the memory die 104 may not be able to receive and handle commands or requests sent from the controller 102.

For some example configurations, the chip enable group in which a memory die 104 is configured may depend on a chip on which the memory die 104 is located. That is, physically, the non-volatile memory system 100 may include one or more chips, with each chip including one or more dies. Memory dies 104 located on the same chip may be part of the same chip enable group and configured to receive the same chip enable signal from the controller 102 to be enabled, whereas memory dies 104 located on different chips may be part of different chip enable groups and configured to receive different chip enable signals from the controller 102 to be enabled. For other example configurations, memory dies 104 may be located on the same die but configured in different chip enable groups.

In addition to being configured in a chip enable group, each of the memory dies 104 may have and/or be assigned a die identification in accordance with a die selection scheme. In order to communicate with (e.g., send a command to and receive responses from) a particular memory die 104 within a chip enable group, the controller 102 may be configured to select or address that particular memory die 104. For some example configurations, the controller 102 may select or address a particular memory die 104 within a chip enable group by issuing a die select command to the chip enable group. The die select command may include the die identification of the memory die 104 with which the controller 102 wants to communicate.

Under the die selection scheme, each of the memory dies 104 within a chip enable group may have a different or unique one of a plurality of die identifications. For some example configurations, a die identification may be an n-bit number. Under this scheme, there may be a maximum number of die identifications to which the memory dies 104 in a chip enable group may be assigned. In particular, where each bit has a value of either logic 1 or logic 0, the maximum number is $2^n$, where n is the number of bits in the n-bit number. In one example, the number of bits is three, and so the maximum number of memory dies 104 that is allowable to be assigned a unique die identification under the die selection scheme is eight (i.e., $2^3$).

Figure 7:
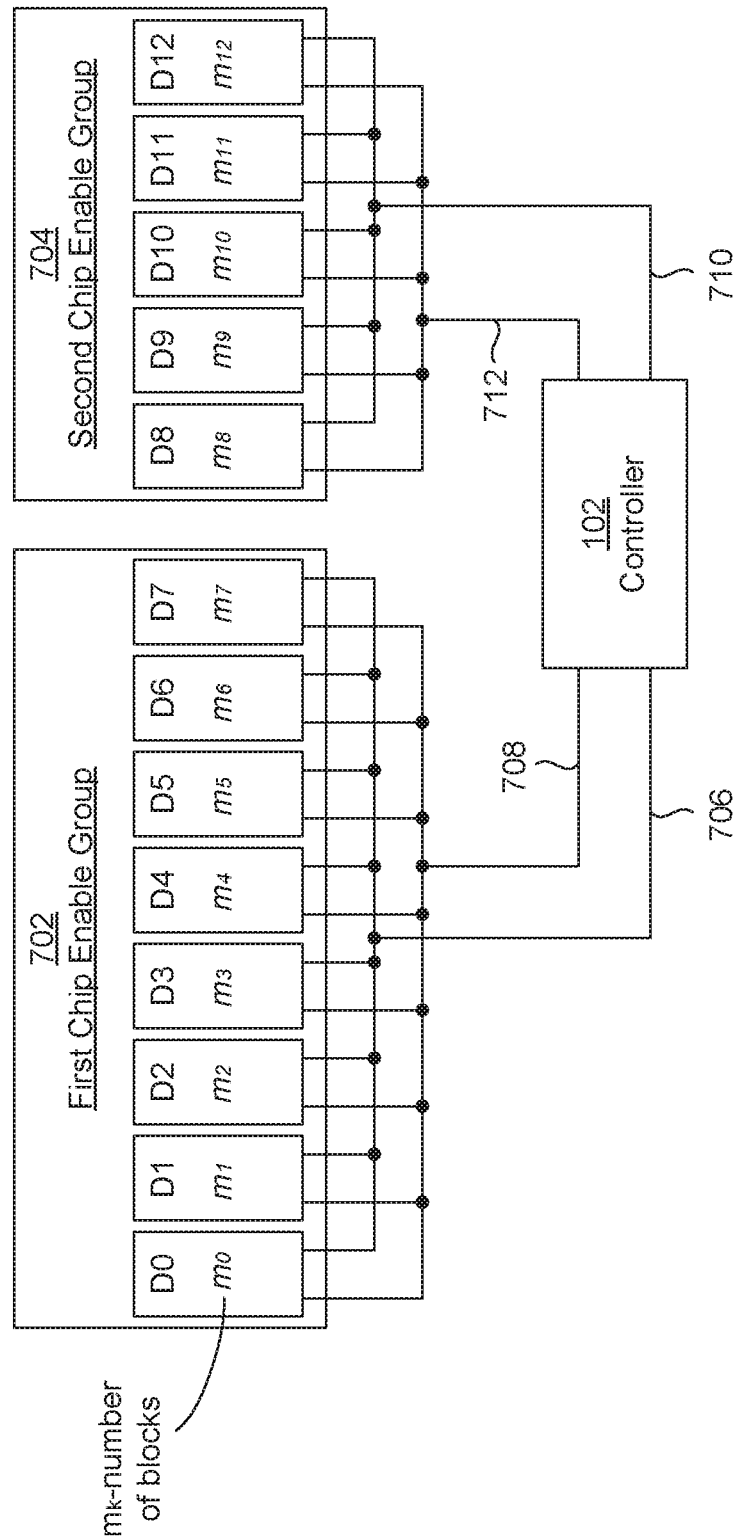
FIG. 7 is a schematic diagram of an example actual die layout for the non-volatile memory system of FIG. 1A.

FIG. 7 show an example actual die layout for the memory system 100, and FIGS. 8-11 show example virtual die layouts, multi-die memory addressing schemes, metablock mappings, and interleave schemes corresponding to the actual die layout of FIG. 7. As used herein, and as described in further detail below, the term "actual" is used to refer to dies, blocks, metablocks or other storage elements that are actually or physically present in the system 100. In addition, the term "actual" is contrasted with the term "virtual," which is used herein to refer to dies, blocks, metablocks, or other storage elements that are not actually or physically present in the system 100, but that the controller 102 recognizes or identifies as being actually or physically present. A die layout, both actual and virtual, may be a representation of and/or identify or include the dies that are in the system 100. A die layout may also include or identify an $m_k$-number of blocks in each of the dies, where k is an index corresponding to a respective die. A die layout may also identify or include chip enable groups in which each of the dies in the layout is configured. An actual die layout may not include or identify any virtual storage elements. That is, an actual die layout may identify only actual storage components, including actual memory dies and actual blocks of those actual dies. In contrast, a virtual die layout may include or identify both actual and virtual storage elements. An actual die in a virtual die layout may include only actual blocks or a combination of actual blocks and virtual blocks. A virtual die may include all virtual blocks.

The controller 102 may use or employ a die layout (actual or virtual) to identify or recognize dies and blocks within the dies to perform memory operations. In addition, the multi-die metablock addressing scheme and corresponding metablock mapping used by the controller may correspond to the die layout used or employed by the controller 102. The controller 102 may recognize, select, and address dies, blocks, and metablocks according to a multi-die metablock addressing scheme and metablock mapping that corresponds to a virtual die layout instead of an actual die layout under one or a combination of the following memory die configuration criteria: (1) the number of actual memory dies configured in a chip enable group has less than a maximum number of memory dies that may be uniquely identified under a die selection scheme; (2) at least two chip enable groups includes different numbers of actual memory dies; and/or (3) at least two of the memory dies have different capacities or different numbers of blocks. Depending on which of the die configuration criteria are applicable, the controller 102 may employ a virtual die layout that includes some combination of virtual dies and/or virtual blocks along with the actual dies and actual blocks physically present in the system 100. Based on the virtual die layout that is employed, the controller 102 may recognize each chip enable group has having the same number of dies, each chip enable group as having the maximum number of dies that may be uniquely identified under the die selection scheme, each of the dies has the same number of blocks, or a combination thereof.

FIG. 7 shows a schematic diagram of an example actual die layout that identifies an actual number of memory dies 104 of the non-volatile memory system 100, chip enable groups in which each of the actual memory dies 104 are configured, and an $m_k$-number of blocks in each of the dies 104. In particular, the actual die layout of FIG. 7 identifies thirteen actual memory dies 104, indicated as D0 to D12, each configured in one of two chip enable groups, including a first chip enable group 702 and a second chip enable group 704. As shown in FIG. 7, the number of actual memory dies in the first chip enable group 702 is greater than the number of actual memory dies in the second chip enable group 704. In particular, the first chip enable group 702 includes eight actual memory dies D0 to D7, and the second chip enable group 704 includes the remaining five actual memory dies D8 to D12. In addition, depending on the configuration, all of the actual memory dies D0 to D12 may have the same $m_k$-number of actual blocks, or alternatively at least two of the memory dies D0 to D12 may have different numbers of actual memory blocks. In a particular configuration, as described in more detail below, the first through twelfth actual memory dies D0 to D11 may have the same number of actual blocks, and the thirteenth die D12 may have about half as many actual blocks as the first through twelfth dies D0 to D11.

FIG. 7 also shows connections between the controller 102 and the actual memory dies D0 to D12. To enable dies D0 to D7 in the first chip enable group 702, the controller 102 may be configured to issue a first chip enable signal on a first chip enable line 706 connecting the controller 102 to actual memory dies D0 to D7 in the first chip enable group 702. In addition, the controller 102 and the actual memory dies D0 to D7 in the first chip enable group 702 may be configured to communicate commands, command responses, and data on a first communications bus 708. Also, to enable the actual memory dies D8 to D12 in the second chip enable group 704, the controller 102 may be configured to issue a second chip enable signal on a second chip enable line 710 connecting the controller 102 to the actual memory dies D8 to D12. Additionally, the controller 102 and the actual memory dies D8 to D12 may be configured to communicate commands, command responses, and data on a second communications bus 712.

The die selection scheme employed by the controller 102 may be a three-bit addressing scheme, yielding the maximum number of dies allowed to be uniquely identified under the scheme to be eight. Accordingly, the number of actual memory dies included in the first chip enable group 702 may be the maximum number of memory dies that may be uniquely identified under the die selection scheme, and the number of actual memory dies included in the second chip enable group 704 may be less than the maximum number of memory dies that may be uniquely identified.

Figure 8:
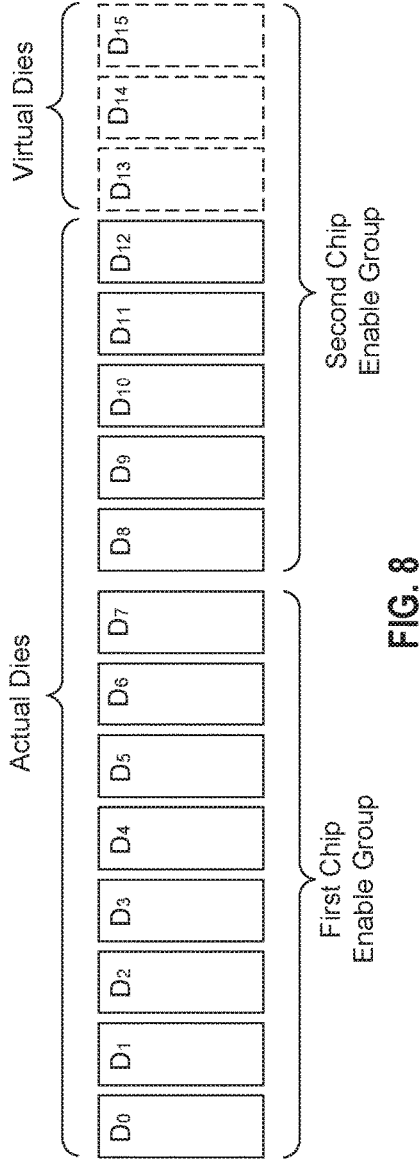
FIG. 8 is a schematic diagram of a virtual die layout corresponding to the actual die layout of FIG. 7.

FIG. 8 shows a schematic diagram of a virtual die layout corresponding to the actual die layout of FIG. 7. As shown in FIG. 8, the second chip enable group may include eight total memory dies, including the five actual dies D8 to D12 physically present in the non-volatile memory system 100, and three additional virtual dies D13 to D15 that are not physically present in the non-volatile memory system 100. By employing the virtual die layout shown in FIG. 8, the controller 102 may be configured to identify or recognize both the second chip enable group and the first chip enable group as having the same and/or maximum number of dies that may be uniquely identified under the die addressing scheme—eight.

As previously mentioned, for some example die configurations, all of the actual memory dies may be of the same capacity or have the same $m_k$-number of blocks. For these configurations, virtual blocks identified in a virtual die layout may be included only in virtual dies. For example, using the virtual die layout in FIG. 8, the actual dies D0 to D12 may be identified as including only actual blocks, and the virtual dies D13 to D15 may be identified as including only virtual blocks. For other example die configurations, one or more of the actual memory dies may have capacities or numbers of blocks that are different from each other. For these other example die configurations, virtual die layouts may include or identify at least some of the actual dies as including both actual blocks and virtual blocks. Virtual blocks may be added to actual memory dies in such a way that the controller 102 identifies or recognizes all of the actual memory dies has having the same capacities and/or the same number of blocks.

Figure 9:
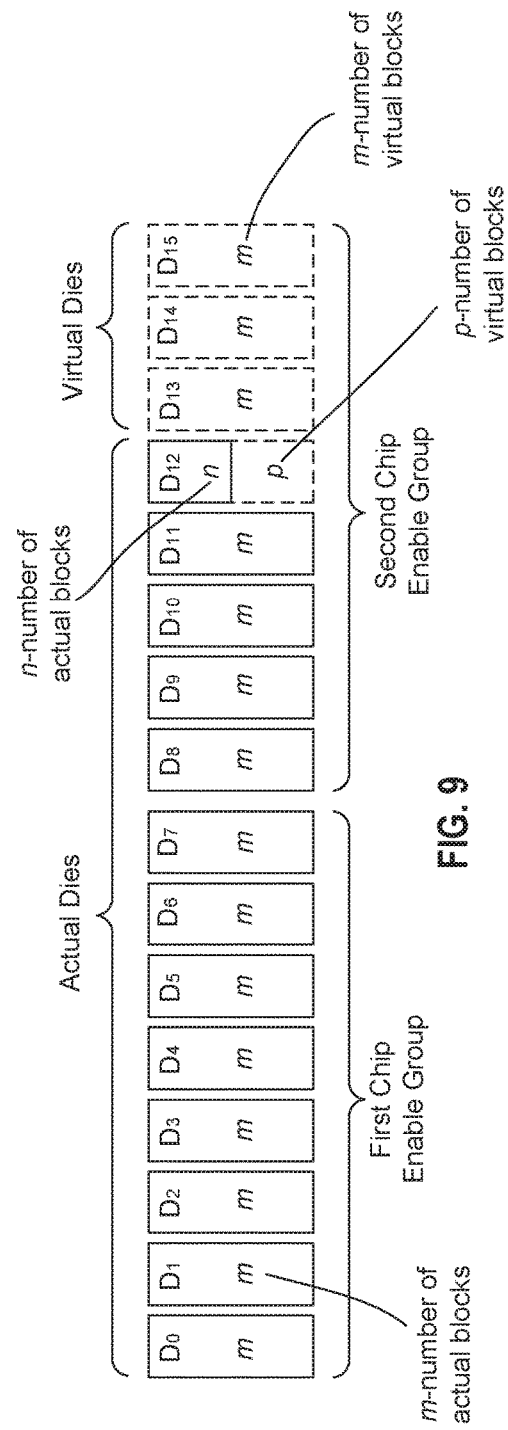
FIG. 9 is a schematic diagram of another example virtual die layout corresponding to the actual die layout of FIG. 7, where an actual die has a capacity that is less than a capacity of the other actual dies.

FIG. 9 shows a schematic diagram of an example virtual die layout where the last actual die D12 has a capacity that less than a capacity of the other actual dies D0 to D11. The virtual die layout may identify that the last actual die D12 has a certain number of virtual blocks so that the controller 102 recognizes the last actual die D12 as having the same number of blocks as the other dies D0 to D11. Accordingly, the virtual die layout may identify the actual memory dies D0 to D11 as having an m-number of actual blocks, virtual dies D13 to D15 as having the same m-number of virtual blocks, and actual die D12 has having an n-number of actual blocks and a p-number of virtual blocks, where n+p=m. As such, from the perspective of the controller 102, the system 100 includes sixteen dies D0 to D15, with each of the dies having the same m-number of blocks.

Similar virtual die layouts may be employed or generated for other die configurations. Another example die configuration may be where each of the chip enable groups has the maximum number of memory dies that are allowed to be uniquely identified under the die selection scheme, but the dies have different capacities or different numbers of dies. For these configurations, the corresponding virtual die layout may not include any virtual dies (i.e., only actual dies), but virtual blocks may be added to the actual dies as appropriate so that each of the dies are identified or recognized by the controller 102 as having the same total (actual and virtual) number of blocks.

Various interleave schemes or combinations of interleave schemes may be employed for die configurations employing a virtual die layout. Additionally, multi-die metablock addressing schemes and corresponding metablock mapping may be employed such that metablock numbers are assigned to both actual metablocks that span actual blocks and virtual metablocks that span virtual metablocks. Under these schemes, metablock numbering may not proceed to a next row until all of the metablocks in a row, both actual and virtual, are assigned a metablock number.

Depending on the configuration of the virtual die layout, a single interleave scheme may be used and/or uniformly employed for all of the dies, virtual and actual. Where the one-die two-plane (1D 2P) interleave scheme is employed, the multi-die metablock addressing scheme and corresponding metablock mapping for a virtual die layout may be similar to those described above.

Figure 10:
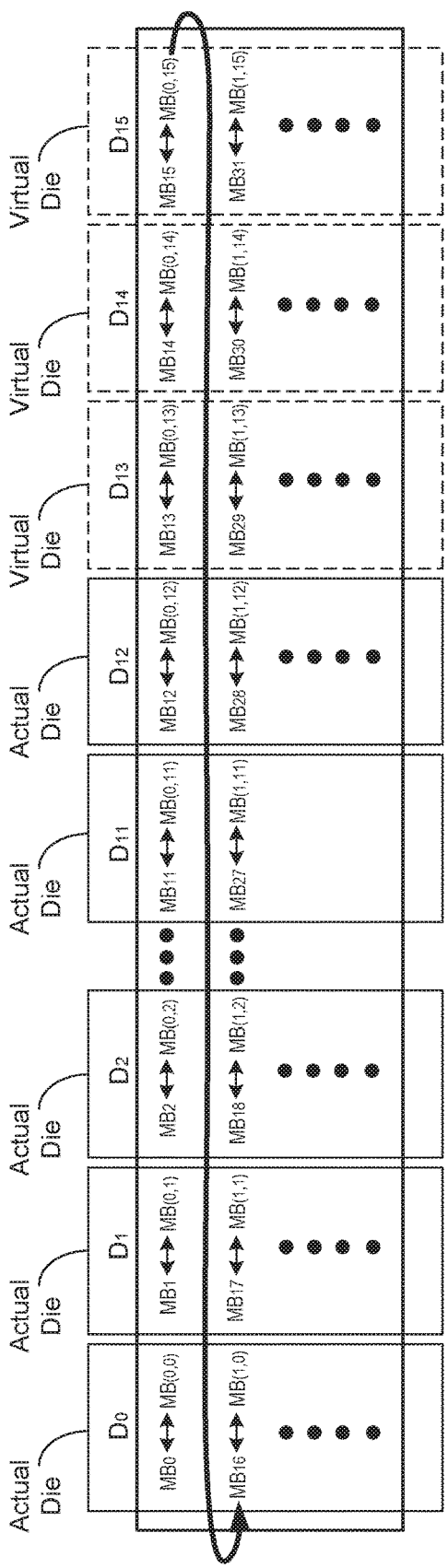
FIG. 10 is a schematic diagram of an example metablock mapping for either of the virtual die layouts of FIG. 8 or 9.

FIG. 10 shows a schematic diagram of an example metablock mapping for either of the virtual die layouts of FIG. 8 or FIG. 9, where one-die, two-plane (1D 2P) is used as the interleave scheme. As shown in FIG. 10, metablock numbering may begin in a first row of metablocks spanning memory dies D0 to D15 in accordance with the multi-die metablock addressing scheme shown and described with reference to FIG. 6. When the last actual metablock in the first row, i.e., metablock $MB_{(0,12)}$ of the thirteenth die D12, is assigned metablock number $MB_{12}$, a next metablock number $MB_{13}$ is assigned to the first virtual metablock $MB_{(0,13)}$ of the virtual die $D_{13}$. After the virtual metablocks in the first row, $MB_{(0,13)}$, $MB_{(0,14)}$, and $MB_{(0,15)}$ are assigned metablock numbers $MB_{13}$, $MB_{14}$, and $MB_{15}$ respectively, metablock numbering may then proceed to the second row, where the second metablock $MB_{(1,0)}$ of the first actual memory die $D_0$ may be assigned metablock number $MB_{16}$, and so on. Metablock numbering may proceed in this fashion until all of the metablocks, both actual and virtual, are assigned a metablock number.

Metablock numbering may proceed in this fashion regardless of whether all of the actual dies of a virtual die layout include all actual blocks, or whether one or more actual dies include some actual blocks and some virtual blocks. For example, referring to FIGS. 9 and 10, when a metablock number is mapped or assigned to an actual metablock of the of the twelfth die D11, a next metablock number may be mapped or assigned to a metablock in the thirteenth die D12. Because the thirteenth die D12 includes half actual blocks and half metablocks, then depending on which row is being numbered, when the next metablock to be assigned a metablock number is in the thirteenth die D12, that next metablock may be an actual metablock or a virtual metablock. That next metablock may be assigned a metablock number under multi-die metablock addressing scheme in the same way, regardless of whether that metablock is an actual metablock or a virtual metablock.

Depending on the virtual die layout, interleave schemes other than single-die, two-plane (1D 2P) may be employed for two or more of the dies. For a multi-die interleave scheme (e.g., 2D 2P, 3D 2P, etc.) may be employed for multiple dies provided that the multiple dies are of the same type, at least in the sense that the dies have the same block configuration—i.e., the memory arrays 142 of the different dies have the same total number of blocks, the same total number of planes, the same number of blocks per plane, the same block sizes, and the same number of wordlines per block. In this way, when a metablock spans multiple dies under the multi-die interleave scheme, the metablock will not include actual blocks of different sizes, will not include a combination of actual blocks and virtual blocks, or some combination thereof. In addition, a multi-die interleave scheme may be employed for multiple dies of the same type where the number of the multiple dies is divisible by the number of the die component of the multi-die interleave scheme so that one or more metablocks resulting from the multi-die interleave scheme do not span a metablock that is not available or does not exist in the system 100 to be spanned. For example, for twelve actual dies, interleave schemes of 2D 2P, 3D 2P, 4D 2P, 6D 2P, and 12D 2P may be employed because twelve is divisible by the die component number of each of those schemes. For purposes of the present description, as long as a multi-die interleave scheme meet these criteria—it is employed for multiple dies of the same type and the number of the multiple dies is divisible by the die component number—then the multi-die interleave scheme may be considered or referred to as a compatible multi-die interleave scheme.

Further depending on the virtual die layout, a multi-die interleave scheme may be uniformly employed for the dies in the system, multiple different multi-die interleave scheme may be employed, or one or more multi-die interleave schemes may employed with a single-die interleave scheme. For the example virtual die layouts of FIGS. 8 and 9, in one example implementation, a two die, two plane (2D 2P) interleave scheme may be employed for the first twelve actual dies D0 to D11, and a single-die, two plane (1D 2P) interleave scheme may be employed for the thirteenth actual die D12 and the three virtual dies D13, D14, and D15.

For some example memory die configurations, at least two of the memory dies 104 may have memory arrays 142 different technologies or types. Example ways that memory arrays 142 may be of different technologies or types may be where the memory arrays 142 have different total number of blocks, the memory arrays 142 have different numbers of planes, the memory arrays 142 have different numbers of blocks/plane, the FGTs have different sizes or gate widths, the block sizes (in bytes or bits) are different, the number of wordlines per block are different, or combinations thereof, as non-limiting examples. Other ways that the memory elements may be of different technologies or types may be possible. For memory dies 104 of different types, different interleave schemes may be employed and/or the interleave schemes may be employed independently for each of the different types. That is, an interleave scheme employed for memory dies of one type may not depend on the interleave scheme employed for memory dies of a different type.

In one example, using the thirteen actual memory die configuration of FIG. 9 where the thirteenth die D12 has a different number of actual blocks as the first through twelfth dies D0 to D11, the first through twelfth dies D0 to D11, having the same number of actual blocks, may be of one type, and the thirteenth die D12, having a different number of actual blocks, may be of a different type. The interleave scheme for the first twelve dies D0 to D11 may be a single die interleave scheme or a compatible multi die interleave scheme, and the interleave scheme for the thirteenth die D12 may be a single die interleave scheme.

In addition or alternatively to having a different number of actual blocks, the blocks of the thirteenth die D12 may have a different size and/or a different number of wordlines per block from the blocks of the memory arrays 142 of the first through twelfth dies D0 to D11. In a similar way as described above, a single die interleave scheme or a compatible multi-die interleave scheme may be employed for the first twelve dies D0 to D11, and a single die interleave scheme may be independently employed for the thirteenth die D12.

For some example configurations, an interleave scheme or a combination of interleave schemes may be employed based on a desired raw performance of the memory dies 104. Raw performance, which may be a measurement in terms of bits or bytes per unit of time (e.g., megabytes per second (MB/s), may be a measure of the performance of the memory without accounting for overhead of the controller 102. In terms of write operations, raw performance may be the rate at which the memory dies 104 can perform a write operation on a metablock without taking into consideration the performance time of the controller 102.

Raw performance may be further quantified on a per plane basis. Performing a write operation on a metablock spanning a larger number of planes may yield a larger raw performance because more planes may allow for more data to be moved in parallel. Accordingly, metablocks with larger sizes may provide greater raw performance. To achieve better raw performance, it may be desirable to set an interleave scheme for the memory dies that yields larger metablocks, provided such an interleave scheme and corresponding metablock sizes are compatible with the actual and/or virtual die layout.

As previously described, one example interleave configuration for the actual die layout shown in FIG. 7 may include a compatible multi-die, two plane interleave scheme for the first twelve actual memory dies D0 to D11, and a single-die interleave scheme for the thirteenth actual memory die D12. In a particular interleave configuration, the multi-die interleave scheme employed for the first twelve dies D0 to D11 may be two die, two plane (2D 2P). Employing two die, two plane (2D 2P) rather than one die, two plane (1D 2P) may yield better raw performance for the first twelve dies D0 to D11.

In addition, for some configurations, memory arrays 142 of different technologies or types may provide or yield different raw performances per plane. In some situations, a single-die interleave scheme for a certain memory type may yield a sufficient raw performance—i.e., a raw performance that meets or exceeds a desired raw performance level. In other situations, a single-die interleave scheme for a certain memory type may yield an insufficient raw performance— i.e., a raw performance that does not meet or exceed a desired raw performance level. If a single-die interleave scheme for a certain memory type yields an insufficient raw performance, it may be desirable to employ a compatible multi-die interleave scheme to increase the metablock size, and as a result, the raw performance to a sufficient level.

As previously described, for some example die configurations of the actual die layout of FIG. 7, at least one of the thirteen dies D0 to D12 may be of a different memory type than one or more of the other dies. If a single-die interleave scheme yields an insufficient raw performance for dies of a certain memory type, a compatible multi-die interleave scheme may be employed for those dies.

In one example, a first NAND flash memory type (referred to as 1Ynm NAND flash memory) may provide a block size of 4 MB and 86 wordlines in each block, and a second NAND flash memory type (referred to as 1Znm NAND flash memory) may provide a block size of 6 MB and 128 wordlines in each block. The raw performance per plane for the first NAND flash memory type may be 10 MB/s/plane, whereas the raw performance per plane for the second NAND flash memory type may be 6.5 MB/s/plane. If, for example, a desired raw performance is greater than 13 MB/s and less than or equal to 20 MB/s, then a single die, two plane (1D 2P) interleave scheme for the second NAND flash memory type may yield an insufficient raw performance. Accordingly, a compatible multi-die, two plane interleave scheme may be employed for the dies of the second NAND flash memory type, whereas a single-die, two plane interleave scheme may be employed for dies of the first NAND flash memory type.

Figure 11:
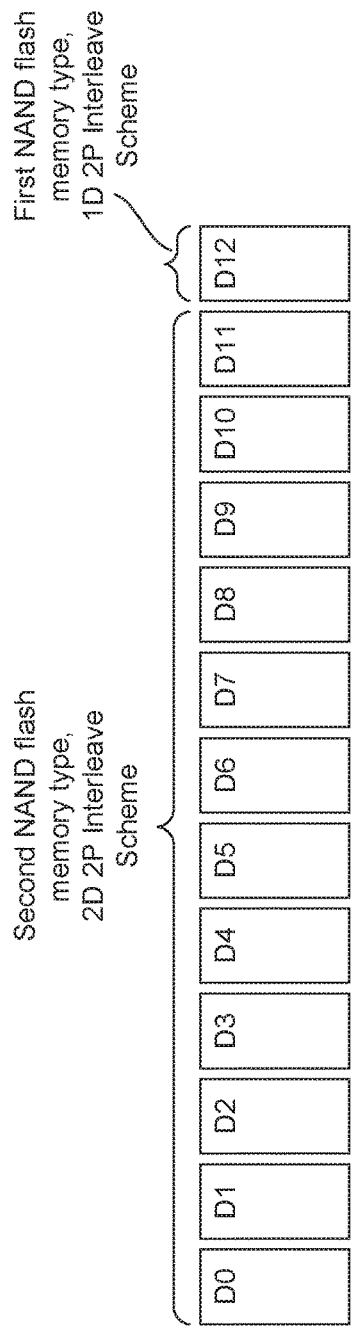
FIG. 11 shows a schematic diagram of an example interleave configuration corresponding to the actual die layout of FIG. 7.

FIG. 11 shows a schematic diagram of a particular interleave configuration for a particular die configuration of the actual die layout of FIG. 7. As shown in FIG. 11, the first through twelfth dies D0 to D11 may include memory elements of the second NAND flash memory type, and the thirteenth die D12 may include memory elements of the first NAND flash memory type. A two die, two plane (2D 2P) interleave scheme may be employed for the first through twelfth dies D0 to D11, and a one die, two plane (1D 2P) interleave scheme may be employed for the thirteenth die D12, so that all of the thirteen memory dies yield a raw performance at or above a desired raw performance level.

As previously described, a metablock size may be determined by the interleave scheme employed and the size of the blocks spanning the metablock. As such, different interleave schemes, different memory types, or a combination thereof may yield different metablock sizes. In addition, as previously described, the controller 102 may use address data structures to map or associate metablock addresses to logical group numbers. The address data structures may include a primary address data structure and one or more secondary address data structures, such as a Group Address Table (GAT), a GAT Delta, and/or a Master Index Page (MIP) as explained above. The address data structures may also include a Free Block List (FBL) to identify blocks that are available for storage and that may be later mapped to logical groups. Where the memory dies 104 include memory elements of different types and/or multiple interleave schemes are employed such that different metablocks have different metablock sizes, the controller 102 may be configured to maintain different sets of address data structures for the different metablock sizes.

In further detail, using the particular die and interleave configurations of FIG. 11 to illustrate, a two die, two plane (2D 2P) interleave scheme for dies of the second NAND flash memory type may yield a metablock size of 24 Megabytes (MB), because one metablock may span six blocks, and each block of the second NAND flash memory type may be six Megabytes (MB) as previously described. On the other hand, a one die, two plane (1D 2P) interleave scheme for dies of the first NAND flash memory type may yield a metablock size of 8 Megabytes, because one metablock size may span two blocks, and each block of the first NAND flash memory type may be four Megabytes (MB) as previously described. The controller 102 may be configured to manage and/or maintain two sets of address data structures, one for 24 MB-sized metablocks, and another for 8 MB-sized metablocks.

Figure 12:
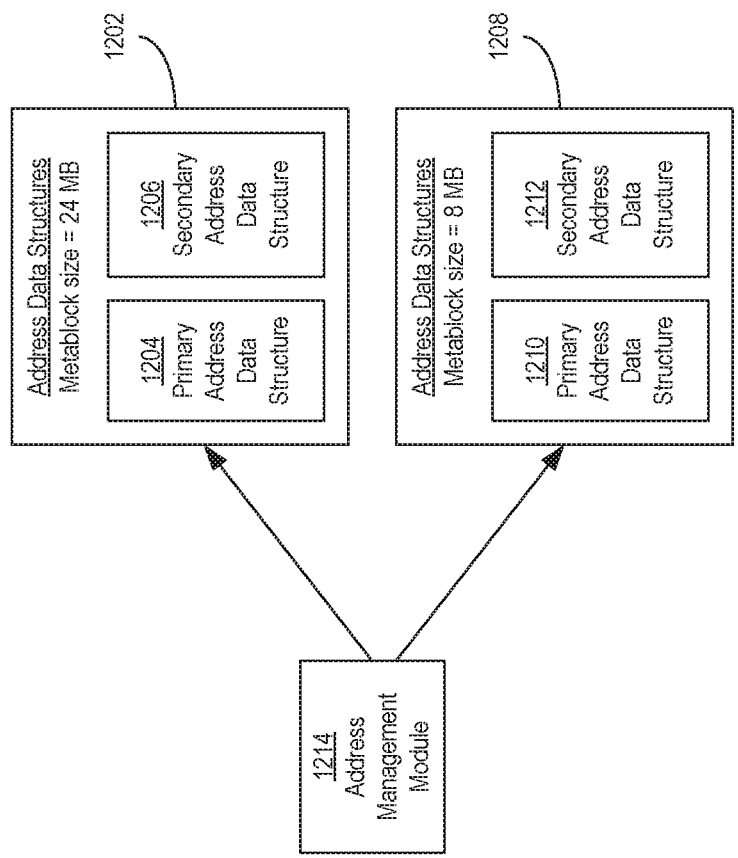
FIG. 12 is a block diagram of two sets of address data structures in communication with an address management module of the controller of FIG. 2A.

FIG. 12 shows a block diagram of the two sets of address data structures. As shown in FIG. 12, a first set of address data structures 1202 may include primary and secondary address data structures 1204, 1206 to provide respective primary and secondary mappings between logical addresses (e.g., logic group numbers) and metablock addresses for metablocks that are 24 MB in size. In addition, a second set of address data structures 1208 may include primary and secondary address data structures 1210, 1212 to provide respective primary and secondary mapping between logical addresses and metablock addresses for metablock that are 8 MB in size. More than two sets of address data structures may be used depending on how many different metablock sizes are generated based on the different interleave schemes and/or different NAND flash memory types in the system 100.

In addition, as shown in FIG. 12, the controller 102 may include an address management module 1214 that manages and/or controls the information in the sets of address data structures 1202, 1208. When access of one of the sets of address data structures 1202, 1208 is needed to perform a memory management operation, the address management module 1214 may be configured to determine which of the sets of address data structures 1202, 1208 to access. For example, if the controller 102 receives a host read request identifying a particular logical group number, the address management module 1214 of the controller 102 may be configured to determine and/or select the appropriate one of the sets of address data structures 1202, 1208 to obtain an associated metablock address. As another example, if the controller 102 writes data to a particular metablock, the address management module 1214 of the controller 102 may be configured to determine which of the sets of address data structures 1202, 1208 to update with a logical address to metablock address mapping.

The address management module 1214 may utilize the sets of address data structures 1202, 1208 statically or dynamically. When utilizing them statically, the address management module 1214 may fixedly associate a first set of logical addresses with metablock addresses of the first address data structure set 1202, and fixedly associate a second, remaining set of logical addresses with metablock addresses of the second address data structure set 1208. In contrast, when dynamically utilizing the sets of addresses data structures 1202, 1208, the address management module 1214 may dynamically change the associations or mappings between the logical addresses and the metablock addresses of the different address data structure sets 1202, 1208. For example, in one instance, a logical address may be mapped to a 24 MB size metablock address of the first address data structure set 1202, and in a second instance, that logical address may be mapped to an 8 MB size metablock address of the second address data structure set 1208. Depending on the circumstances, the address management module 1214 may dynamically change certain mappings in order to accommodate write patterns more concentrated to particular logical addresses hence ensuring wear leveling.

When the controller 102 employs a virtual die layout to recognize, select, or address metablocks, the controller 102 may be configured to identify the virtual metablocks as being inaccessible or unusable for storage. In doing so, the controller 102 may be configured to be prevented from adding virtual metablocks to the Free Block List. For some example configurations, during manufacturing of the non-volatile memory system 100, memory testing may performed on the memory dies 104 as part of the manufacturing process to identify non-usable (i.e., "bad") blocks. Blocks identified as non-usable during the memory testing may be added to a Bad Block List. The controller 102 may be configured to be prevented from adding blocks in the Bad Block List to the Free Block List(s). For these configurations, virtual metablocks may be added to the Bad Block List so that the controller 102 may identify the virtual metablocks as being unusable. As a result, even though the controller 102 may identify or recognize the virtual metablocks as being physically present in the system 100, it may not attempt to access them to perform a memory operation (e.g., read, write, erase, etc.).

When the controller 102 determines to write data into the memory dies 104, such as in response to receipt of a host write request, the controller 102 may be configured to select one or more actual metablocks in the actual memory dies 104 to write the data. The controller 102 may be configured to select the actual metablocks in accordance with a wear leveling scheme. In general, under a wear leveling scheme, data may be programmed into actual metablocks in an evenly distributed manner across the plurality of actual memory dies 104. Accordingly, when the controller 102 is to select an actual metablock into which to program data, the actual metablock that the controller 102 selects may be in a die (or span multiple dies) that is different from a die in which the controller 102 last programmed data. In addition, after the controller 102 writes data into an actual metablock of a die, the controller 102 may not write data into another actual metablock of the same die until a number of the other actual dies have been written to. To illustrate, referring to the actual die layout of FIG. 7 as an example, suppose a single-die interleave is employed such that metablocks span a single die, and further suppose the controller 102 selects an actual metablock in the first die D0 to program data. When the controller 102 is to select another actual metablock to program other data, the controller 102 may select an actual metablock located in an actual die other than the first die D0. The controller 102 may not return to the first die D0 to select another actual metablock to program data until the controller 102 has selected an actual metablock from each of a determined number of the other actual dies D1 to D12 and programs data into those actual metablocks. As another illustration, suppose a two-die, two plane interleave scheme is employed, and suppose the controller 102 selects an actual metablock spanning the first and second actual dies D0, D1 to program data. When the controller 102 is to select another actual metablock to program other data, the controller 102 may select an actual metablock located in or spanning actual dies other than the first and second dies D0, D1. The controller 102 may not return to the first and second dies D0, D1 to select another actual metablock to program data until the controller 102 has selected an actual metablock spanning each of a determined number of the other dies D2 to D12.

The controller 102 may be configured to program data into the actual memory dies 104 in accordance with a wear leveling scheme that includes programming rounds, with each programming round identifying one or more actual memory dies 104 of the system 100 from which the controller 102 selects an actual metablock to program data into. The controller 102 may not proceed to a next programming round to program data until the controller 102 has programmed data into an actual metablock in all of the actual dies identified in a current programming round.

The actual memory dies 104 identified in the programming rounds may be the same or different from one programming round to the next. For some example configurations, the controller 102 may be configured to dynamically create the programming rounds by dynamically selecting the actual memory dies 104 to be identified in the programming rounds. For other example configurations, the actual memory dies 104 that are identified in each of the programming rounds may be based on a wear leveling pattern.

One example wear leveling pattern may identify the actual memory dies 104 in each of the programming rounds based on the capacities or numbers of actual blocks in each of the actual dies 104 of the system 100 relative to each other. A maximum or largest capacity, in terms of a number of bytes or a number of actual blocks among the actual memory dies 104 may be determined, and capacity ratios or percentages of capacities relative to the maximum or largest capacity may be determined for each of the actual dies 104. The actual memories dies 104 may be identified in the programming rounds based on the respective ratios or percentages. To illustrate, as non-limiting examples, an actual memory die 104 that includes the maximum capacity may be identified in every programming round; an actual memory die 104 that includes one-half (i.e., 50%) the maximum capacity may be identified in one-half of the programming rounds or identified one time in every two programming rounds; an actual memory die 104 that includes one-third the maximum capacity may be identified in one-third of the programming rounds or one time in every three programming rounds; an actual memory die that includes two-thirds the maximum capacity may be identified in two-thirds of the programming rounds or two times in every three programming rounds; and so on.

Referring back to the die configurations and layouts shown in FIGS. 7 and 9, in one example, the thirteenth die D12 may have a capacity that is about half the capacity as the other dies D0 to D11. For example, in terms of actual blocks (assuming that each block has the same number of bytes), the thirteenth die may have an n-number of actual blocks that is about half the m-number of actual blocks of each of the other dies D0 to D11, as previously described. For this example configuration, the wear leveling scheme may identify the maximum capacity as being the capacity of any of the first twelve dies D0 to D11 (or the maximum number of blocks as being the m-number of blocks). Each of the first through twelfth dies D0 to D11 may have associated ratios and percentages of 1-to-1 and 100%, respectively. The thirteenth die D12, having about half the capacity, may have an associated ratio and percentage of 1-to-2 and 50%, respectively.

Figure 13:
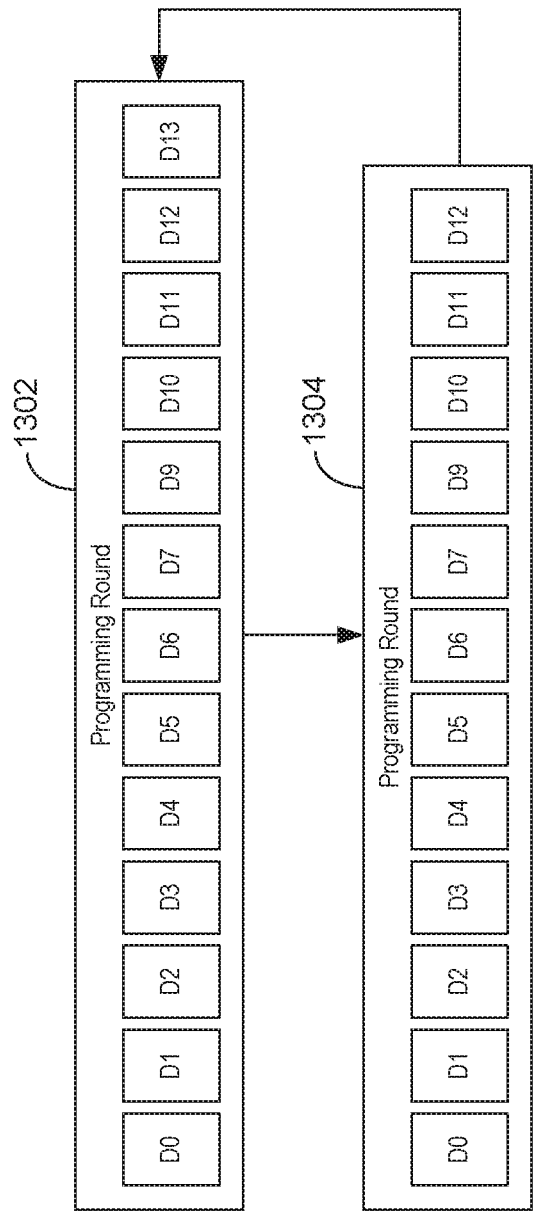
FIG. 13 shows a schematic diagram of a wear leveling pattern for the actual die layout of FIG. 7 based on example ratios of capacities of the dies.

FIG. 13 shows a schematic diagram of an associated wear leveling pattern that may be employed by the controller 102 based on the ratios/percentages of the dies D0 to D12, where the thirteenth die D12 has half the capacity as the other twelve dies D0 to D11. FIG. 13 shows the wear leveling pattern as having two types of programming rounds, including a first programming round 1302 and a second programming round 1304. The first programming round 1302 identifies all thirteen dies D0 to D12, and the second programming round 1304 identifies only the first twelve dies D0 to D11. In other words, the thirteenth die D12 is identified in only half of the programming rounds. When writing data to the dies D0 to D12, the controller 102 may select a metablock from each of the dies D0 to D12 identified in the first programming round 1302. After a metablock from each of the dies D0 to D12 have been selected, the controller 102 may move to the second programming round 1304 to make subsequent metablock selections. After selecting a metablock from each of the dies D0 to D11 identified in the second programming round, the controller 102 may then move back to the first programming round 1302 to make metablock selections, thus repeating the wear leveling pattern.

Figure 14:
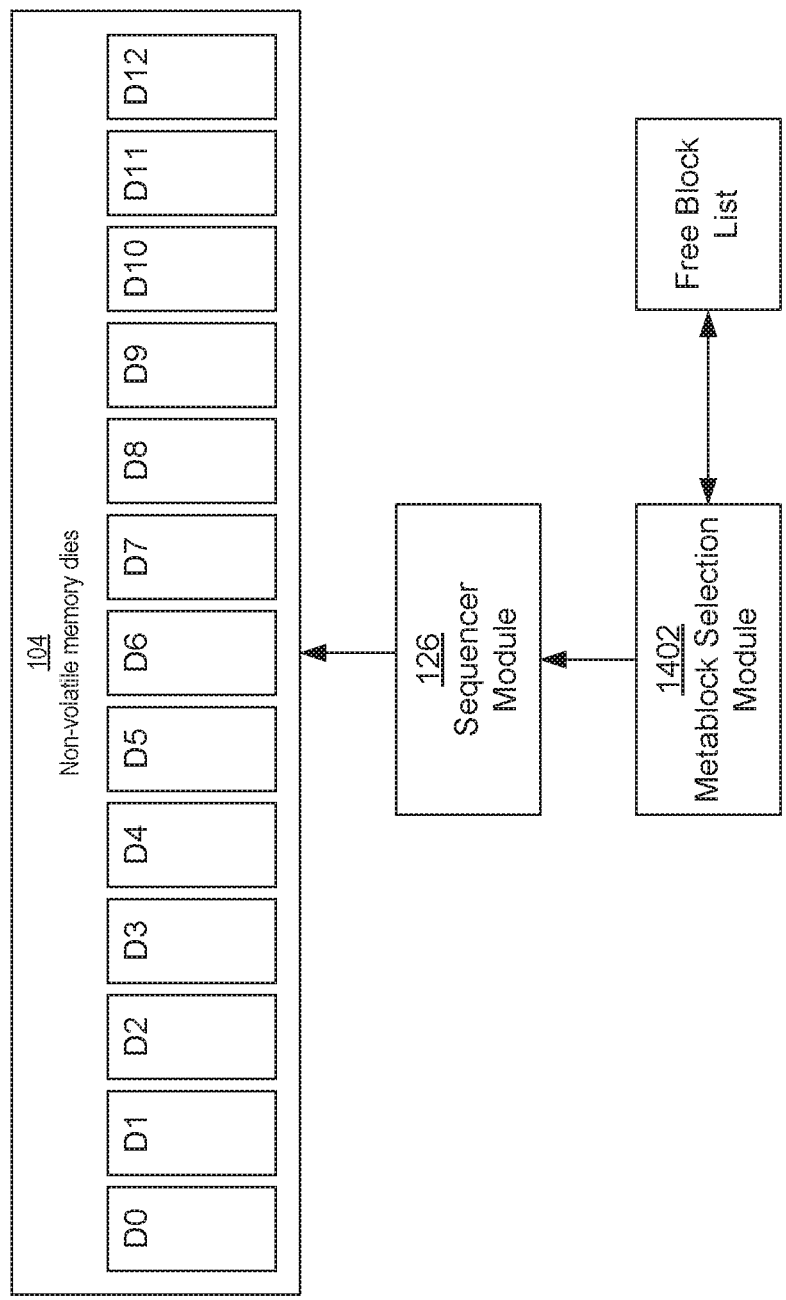
FIG. 14 is a block diagram of a metablock selection module and a sequencer module of the controller of FIG. 2A for implementing a wear leveling scheme.

FIG. 14 shows a block diagram of a metablock selection module 1402 and the sequencer 126 of the controller 102. To determine where to write data into the non-volatile memory dies 104, the metablock selection module 1402 may select metablocks available for storage according to a wear leveling pattern. As previously mentioned, the available metablocks may be identified in a Free Block List. Using the wear leveling pattern shown in FIG. 13 as an example, to write data into the non-volatile memory dies 104, the metablock selection module 1402 may be configured to select an available metablock identified in the Free Block List from each of the dies D0 to D12 identified in the first programming round 1302. For example, the metablock selection module 1402 may select an available metablock located in the first die D0. Then, when the metablock selection module 1402 is to select another metablock in which to write data, the metablock selection module 1402 may select a metablock located in a die identified in the first programming round 1302 other than the first die D0, such as an available metablock located in the second die D1 for example. Subsequently, when the metablock selection module 1402 is to select another metablock into which to write data, the metablock selection module 1402 may select a metablock located in a die identified in the first programming round 1302 other than the first and second dies D0, D1, such as the third die D2 for example. The metablock selection module 1402 may continue to select metablocks in this manner until the metablock selection module 1402 has selected a metablock from each of the thirteen dies D0 to D12 identified in the first programming round 1302. After a metablock from each of the thirteen dies D0 to D12 identified in the first programming round 1302 has been selected, then when the metablock selection module 1402 is to select another available metablock in which to write data, the metablock selection module 1402 may move to the second programming round 1304 to make the selection. As the metablock selection 1402 needs to select available metablocks in which to write data, the metablock selection module 1402 may continue to select a metablock from a different one of the twelve dies D0 to D11 identified in the second programming round 1304 until the metablock selection module 1402 has selected a metablock from each of the twelve dies D0 to D11. After a metablock from each of the twelve dies D0 to D11 identified in the second programming round 1304 has been selected, then when the metablock selection module 1402 is to select another available metablock in which to write data, the metablock selection module 1402 may move back to the first programming round 1302 to make the selection and the wear leveling pattern may be repeated.

After the metablock selection module 1402 selects an available metablock from the Free Block List in accordance with the wear leveling scheme, the metablock selection module 1402 may provide the metablock address of the selected available metablock to the sequencer module 126. The sequencer module 126 may be configured to generate program commands or command sequences that instruct a state machine module 152 of a die 104 (see FIG. 2B) to write the data. As previously described, the metablock address selected from the Free Block List may be an abstract physical address. The sequencer module 126 may be configured to convert the abstract physical addresses (metablock addresses) received from the metablock selection module 1402 into actual physical addresses (e.g., ones that identify a particular memory die 104 and the block, the page, and the column within that particular memory die 104) to generate the program commands. The sequencer module 126 may then send, through the memory interface 130 (not shown in FIG. 14), the program commands or command sequences and the data to the die (or dies) where the selected metablock is located in order to write the data.

In some situations, the ratios or percentages determined for the wear leveling scheme may be rounded to desired values. For example, referring back to FIG. 9, in one actual implementation, the m-number of actual blocks for the first twelve dies D0 to D11 may be 1446, whereas the n-number of actual blocks for the thirteenth die may be 720. Even though 720 is not exactly one-half of 1446, the corresponding ratio or percentage may be rounded to 1-to-2 or 50% so that the thirteenth die is identified in every other programming round.

Referring back to FIG. 2A, when the non-volatile memory system 100 initially starts up (e.g., is powered on), the components of the non-volatile memory system 100 may be configured to perform an initialization process in order to perform memory management functions and respond to host requests (read, write, erase, etc.). In general, the initialization process may include initializing the plurality of memory dies 104 and loading firmware into the RAM 116. For configurations where the controller 102 employs a virtual die layout that identifies virtual dies, such as the one shown in FIG. 8, the ROM 118 may initialize only some of the actual memory dies 104, and the firmware, after being loaded into the RAM 116, may be configured to initialize the remaining actual memory dies 104.

Figure 15:
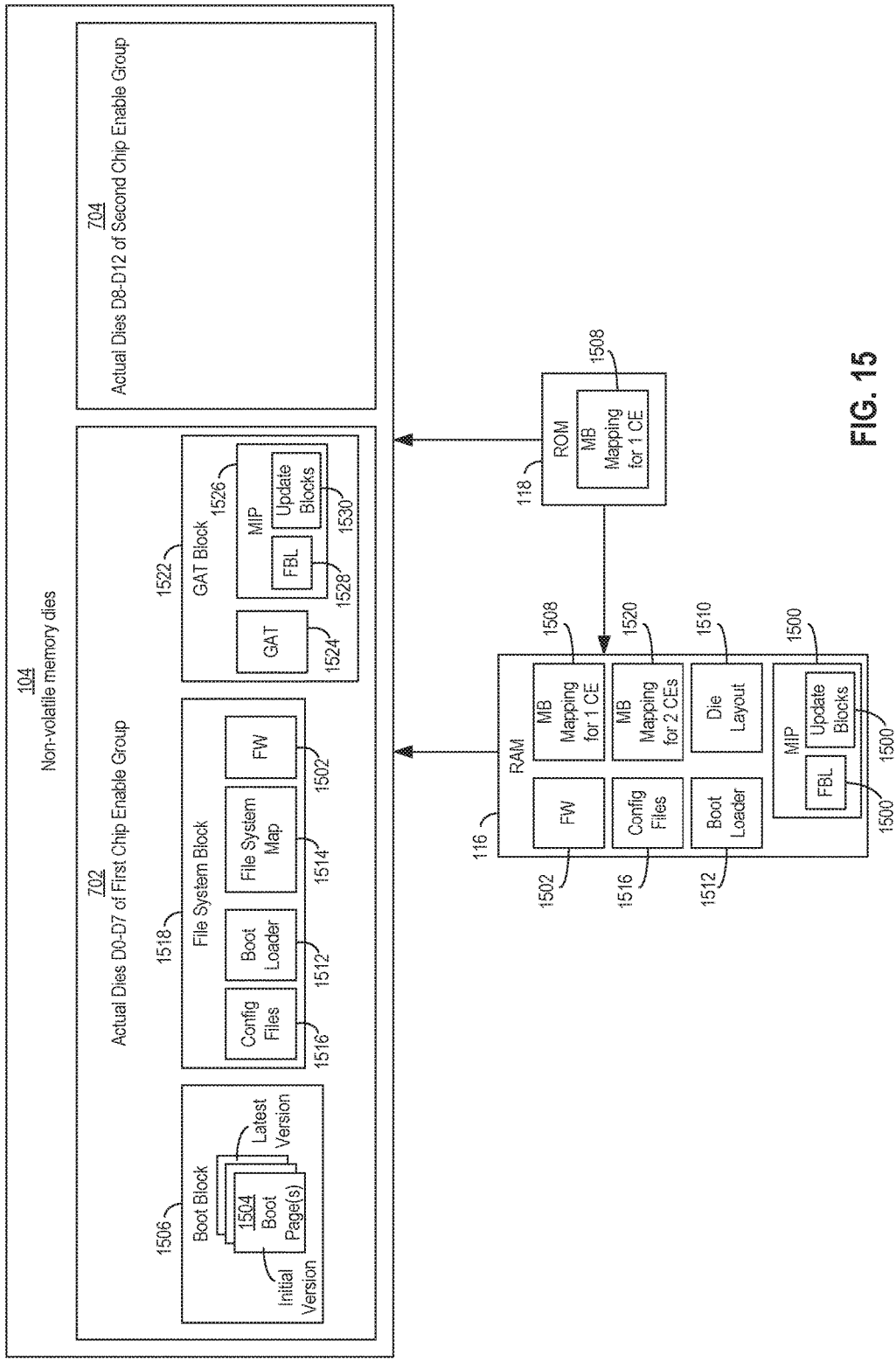
FIG. 15 is a block diagram of components of the non-volatile memory system if FIG. 1A involved in an example initialization process.

In further detail, FIG. 15 shows a block diagram of components of the non-volatile memory system 100 that may be involved in an example initialization process where the controller 102 utilizes a virtual die layout that identifies one or more virtual dies. The following example initialization process is described for the actual die layout of FIG. 7, where the first through eighth actual dies D0 to D7 are configured in the first chip enable group 702, and the ninth through thirteenth actual dies D8 to D12 are configured in the second chip enable group 704. Upon completing initialization, the controller 102 may identify sixteen dies D0 to D15, including the three actual dies D0 to D12 and three virtual dies D13 to D15, as described with reference to the virtual die layout shown in FIG. 8. For simplicity, the individual actual dies D0 to D12 are not shown in FIG. 15.

In general, firmware (FW) 1502 (also and/or interchangeably referred to as flashware), when loaded into the RAM 116, may be the primary software that the controller 102 executes to perform its memory management functions.

However, when initially powered up, the firmware 1502 is not stored in the RAM 116. Accordingly, the ROM 118 may be in initial control of the initialization process to initialize the actual memory dies 104 and load the firmware 1502 and other necessary files or data into the RAM 116.

The initialization process may begin when the host issues an initialization command to the non-volatile memory system 100. In response to receipt of the initialization command, the ROM 118 may be configured to initialize an initial memory die where a boot page 1504 is stored. Upon initializing the initial die, the ROM 118 may retrieve the initial boot page 1504 from the initial memory die. For some example configurations, the initial memory die may be the first die D0 in the first chip enable group 702, although a die in the first chip enable group 702 other than the first die D0 may be used. The ROM 118 may be configured to initialize the initial memory die by sending an initialization command, otherwise referred to as a power-on-reset (POR) command, to the initial memory die.

Referring to FIG. 2B, each of the memory dies 104 may be configured to initialize themselves upon receipt of a POR command from the controller 102. Each of the memory dies 104 may become initialized in order to perform associated memory functions, which may include program (SLC and MLC), read, erase, set feature, and get feature functions, as examples. Each memory function may have an associated parameter set that is to be loaded into the respective memory die's volatile memory 154 in order for the memory die 104 to perform that memory function. The associated parameter sets may be stored in the non-volatile memory array 142 of the memory die 104. Accordingly, when a memory die 104 receives a POR command from the controller 102, the state machine 152 of the memory die 104 may detect the POR command and in response, access the parameter sets stored in the non-volatile memory array 142 and load them into the volatile memory 154. After the parameter sets are loaded into the volatile memory 154, the memory die 104 may be initialized to perform its memory functions. Accordingly, when the parameter sets are loaded, the state machine 152 may send a non-busy signal to the controller 102, indicating that the memory die 104 is finished initializing itself.

Referring back to FIG. 15, when the ROM 118 issues a POR command to the initial die, the initial die may initialize itself and then respond back to the ROM 118 with a non-busy signal when it is finished. Upon detection of the non-busy signal, the ROM 118 may then search for a boot block 1506 located in the initial die. The boot block 1506 may store at least one boot page 1504. The boot block 1506 may be a single storage block in the initial die, or may span a plurality of blocks. Upon locating the boot block 1506, the ROM 118 may retrieve an initial boot page of the at least one boot page 1504. Each boot page 1504 may identify features of a die layout, including the number of chip enable groups, the number of dies in each chip enable group, and the interleave scheme employed for those dies. In some situations or during some initialization processes, the boot block 1506 may store a plurality of boot pages 1504 because a new boot page may be created when there are address updates to information identified in the boot page 1504. However, the die layout features may remain the same, and so initially, when there are a plurality of boot pages 1504 stored in the boot block 1506, it may not matter which boot page the ROM 118 initially accesses.

Upon retrieving the initial boot page 1504, the ROM 118 may be configured to identify the actual memory dies in the non-volatile memory system 100 and the chip enable groups in which they are configured as being those identified in the initial boot page 1504. In addition, the ROM 118 may be configured to generate the metablock mapping that maps metablock addresses to the metablocks across the dies based on the die layout features identified in the boot page 1504.

The ROM 118 may be configured to initialize the dies identified in the boot page 1506 (other than the initial die since it is already initialized) by sending POR signals to each of those other dies. However, the ROM 118 may not distinguish between actual dies and virtual dies since virtual dies will appear to components of the controller 102 has actual dies, albeit unusable or inaccessible. Since it may be undesirable for the ROM 118 to initialize dies that do not exist, the die layout features in the boot page 1504 retrieved by the ROM 118 may identify only actual dies. In addition, for some example configurations, the ROM 118 may generate metablock mappings for complete chip enable groups (i.e., chip enable groups that have the maximum number of actual dies allowed to be identified under the die selection scheme or chip enable groups that do not have virtual dies), but may be unable to generate metablock mappings for incomplete chip enable groups (i.e., chip enable groups that do not have the maximum number of actual dies allowed to be identified under the die selection scheme or chip enable groups that have virtual dies). Accordingly, the boot page 1504 may identify the first chip enable group 702 and the first through eight dies D0 to D7 configured in the first chip enable group 702, and may not identify that there is a second chip enable group 704 and/or the ninth through thirteenth actual dies D8 to D12 and the three virtual dies D13 to D15 configured in the second chip enable group 704.

Upon receipt of the initial boot page 1504, the ROM 118 may be configured to send POR commands to the actual memory dies configured on the first chip enable group 702, other than the initial die, and not to the actual memory dies configured in the second chip enable group 704. So, for example, if the initial die is the first die D0, then upon receipt of the initial boot page 1504, the ROM 118 may be configured to initialize the second through eighth dies D1 to D7 by sending POR commands to each of dies D1 to D7. Each of the second through eighth dies D1 to D7 may perform initializations as described above in response to the POR commands and return non-busy signals to the ROM 118 when they are finished.

In addition to sending POR commands to each of the other dies in the first chip enable group 702, the ROM 118 may be configured to generate the metablock mapping 1508 for the first through eighth dies D0 to D7 in the first chip enable group 702, without considering the five other actual dies D8 to D12 configured in the second chip enable group 704. The metablock mapping 1508 for the single chip enable group may be generated in a similar way as those previously described. For example, for a one die, two plane (1D 2P) interleave scheme, metablock numbers may be assigned to metablocks across the first eight actual dies D0 to D7 according to the mapping shown in FIG. 6, where N is eight. As shown in FIG. 15, the ROM 118 may be configured to load the metablock mapping 1508 for the single chip enable group 702 into the RAM 116. In addition, the ROM 118 may be configured to load a die layout 1510 or similar data structure corresponding to the die layout features identified in the initial boot page 1504—i.e., one that identifies the die layout for the system 100 as including a single chip enable group having eight dies D0 to D7.

After the dies D0 to D7 in the first chip enable group 702 are initialized, the ROM 118 may be configured to locate a boot loader file 1512 stored in the first chip enable group 702 of the non-volatile memory 104 and load a copy of the boot loader file 1512 into RAM 116. Loading the boot loader file 1512 into the RAM 116 may allow the RAM 116 to retrieve the firmware 1502 stored in the non-volatile memory 104. To locate the boot loader file 1512 in the non-volatile memory 104, the ROM 118 may be configured to retrieve the latest version of the boot page 1504, presuming the one that the ROM 118 initially retrieved is not the latest version. The latest version of the boot page 1504 may point to a system file map 1514 that provides a map or guide to where various system files needed for completion of the initialization process are located in the non-volatile memory dies 104, including the boot loader file 1512. For some example configurations, as shown in FIG. 15, the boot loader file 1512, the firmware 1502, the file system map 1514, along with configuration files 1516 (described in further detail below), may be stored in a file system block 1518, which may be a single block or span a plurality of blocks. Upon using the file system map 1514 to locate the boot loader file 1512, the ROM 118 may load the boot loader file 1512 in the RAM 116.

When the RAM 116 executes the boot loader file 1512, the RAM 116 may access the system file map 1514 to locate the firmware 1502 (which may also be referred to as flashware), and upon locating the firmware 1502, load the firmware 1502 into its memory. Upon the firmware 1502 being loaded into the RAM 116, the RAM 116, by executing the firmware 1502, may be configured to identify the dies, both actual and virtual, configured in the second chip enable group 704. In this way, the RAM 116 may not have to access a boot page 1504 or other information in the boot block 1506 or the file system block 1518 to identify the dies in second chip enable group 704. In addition, as mentioned, the components of the controller 102 may not distinguish between actual and virtual dies, and so upon executing the firmware 1502, the RAM 116 may identify generically that there is an additional chip enable group that includes eight dies. However, as was the case for the ROM 118, it may be undesirable for the RAM 116 to attempt to initialize dies that are not physically present in the system 100, and so the firmware 1502, upon being loaded in the RAM 116 and executed, may cause the RAM 116 to initialize the actual memory dies and not the virtual memory dies that were not previously initialized by the ROM 118, which in this case includes the ninth through thirteenth dies D8 to D12 configured in the second chip enable group 704.

In addition, upon identifying the eight additional dies D9 to D15 in the second chip enable group 704 when loading the firmware 1502, the RAM 116 may be configured to modify the die layout 1510 to a virtual die layout that identifies the second chip enable group 704 having eight dies, such as the virtual die layouts shown and described with reference to FIGS. 8 and 9. As such, by loading the firmware 1502, the RAM 116 may be configured to identify two chip enable groups, including the first chip enable group 702 having the first eight actual dies D0 to D7 and the second chip enable group 704 having five actual dies D8 to D12 and three virtual dies D13 to D15. Also, the RAM 116 may be configured to generate a second metablock mapping according to the sixteen-die configuration shown and described with reference to FIG. 10.

As a result, the RAM 116 may be configured to employ and/or maintain at least two metablock mappings, including the first metablock mapping 1508 that maps metablock addresses to metablocks according to a die layout that identifies a single chip enable group having eight dies, and a second metablock mapping 1520 that maps metablock addresses to metablocks according to a die layout that identifies two chip enable groups each having eight dies. Files or other data that the RAM 116 and/or the ROM 118 may access during the initialization process may be addressed with metablock addresses that are mapped to metablocks according to the first metablock mapping 1508. Such files or other data may include those stored in the boot block 1506, the file system block 1518, and address data structures stored in an address management or GAT block 1522. In particular, some files accessed during the initialization process, namely the boot page 1504 and the file system map 1514, may point to or identify where other files accessed during the initialization process are stored. Such pointers or identifications may include metablock addresses that are mapped to metablock numbers under the first metablock mapping 1508. As such, when the ROM 118 and/or the RAM 116 wants to access these files and/or wants to store new files or data to be accessed during a current or future initialization process and obtains metablock numbers to do so, the ROM 118 and/or the RAM 116 may be configured to use the first metablock mapping 1508 rather than the second metablock mapping 1520. In this regard, files or other data addressed with metablock address mapped according to the first metablock mapping 1508 may always be stored in dies configured in the first chip enable group 702 so that when the RAM 116 and/or the ROM 118 wants to access these files or other data, they will indeed be stored there.

In contrast, files or other data that the RAM 116 and/or the ROM 118 may not access during the initialization process may be addressed with metablock addresses that are mapped to metablocks according to the second metablock mapping 1520. As such, when the RAM 116 wants to access or store files or other data that will not be accessed during initialization, such files or other data may be addressed with metablock addresses that are mapped to metablocks according to the second metablock mapping 1520. An example may include data that is stored in response to receipt of a host write request, which the controller 102 may receive and process after it completes the initialization process. The metablock address that is assigned to that data may be mapped to one or more metablock according to the second metablock mapping 1520. Also, it should be noted that while the address data structures stored in the GAT block 1522 themselves may be addressed with metablock addresses mapped according to the first metablock mapping 1522, the logical to physical address mappings that the address data structures provide may include metablock addresses mapped to metablocks according to the second metablock mapping.

In addition, upon loading the firmware 1502, the RAM 116 may be configured to access the configuration files 1516 located in the file system block 1518. The configuration files 1516 may identify various features or parameters for performing memory management functions in the non-volatile memory system 100. For example, one of the configuration files 1516 may identify an interleave scheme to employ for the sixteen dies D0 to D15. Another configuration file 1516 that the RAM 116 loads may be the Bad Block List identifying which of the blocks are unusable, as previously described. Other configuration files 1516 may identify other features or operating parameters of the controller 102, such as whether to enable wear leveling, whether to enable ECC, whether to enable on-chip or off-chip copying, what types of garbage collection or other background operations to perform and/or capacities at which to perform them, folding parameters, delay parameters between commands being issued, and dynamic read voltage levels, as non-limiting examples.

After the configuration files 1516 are loaded into the RAM 116, the RAM 116 may be configured to locate the address management or GAT block 1522. FIG. 15 shows the GAT block 1522 storing a first address data structure or GAT 1524 and a second address data structure or MIP 1526, although other or additional address data structures may be stored in the GAT block 1522. The MIP 1526 may include the Free Block List (FBL) 1528 and update blocks 1530. Upon locating the address block 1522, the MIP 1526 may be loaded into the RAM 116. Subsequent updating of one or more address data structures may be performed as part of the initialization process.

When the initialization procedure is complete, the non-volatile memory system 100 may be considered ready to receive and handle host requests, such as host read and write requests. Accordingly, when the initialization procedure is complete, the controller 102 may respond to the host to indicate that initialization is complete.

Referring back to FIG. 2A, the controller 102 may include a sequencer module 126 configured to generate commands and/or command sequences for read and write operations, as previously described. Additionally, as previously described, the sequencer module 126 may be configured to convert a metablock address to an actual physical address in order to generate and determine where particularly to send the commands and/or command sequences. Because multiple different metablock mappings, such as the first and second mappings 1508, 1520 described with reference to FIG. 15, may be used to map metablock addresses to metablocks, the sequencer 126 may be configured to know which mapping 1508, 1520 to use upon receipt of a metablock address to determine the correct actual physical address.

In addition, different actual physical addresses or command formats may be used for different types of memory arrays 142. For example, memory arrays 142 with different numbers of actual blocks and/or different numbers of wordlines per block may use different numbers of bytes in their respective actual physical addresses to indicate the different numbers of blocks and/or different wordlines. When the non-volatile memory system 100 includes actual memory dies 104 of different types, the sequencer module 126 may be configured to properly generate the actual physical addresses and/or commands generally so that the different dies 104 of the different types may correctly process and respond to the commands received from the sequencer 126. In general, the non-volatile memory system 100 may be adapted to perform memory management functions in accordance with different types or technologies of the memory dies 104. For example, different read voltage levels may be applied to memory arrays of different technologies to read and program data. Also, when performing error correction, the ECC module 124 may use a dynamic read table to adjust the read voltage level in order to try to reduce the number of errors identified in read data. These read tables may be different between memory arrays 124 of different types. Accordingly, the ECC module 124 may be configured with different dynamic read tables and properly choose these different dynamic read tables as appropriate when performing error correction. Other ways that the non-volatile memory system 100 may be properly adapted to perform memory management functions for memory dies 104 of different technologies or types may be possible.

In addition, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

Figure 16:
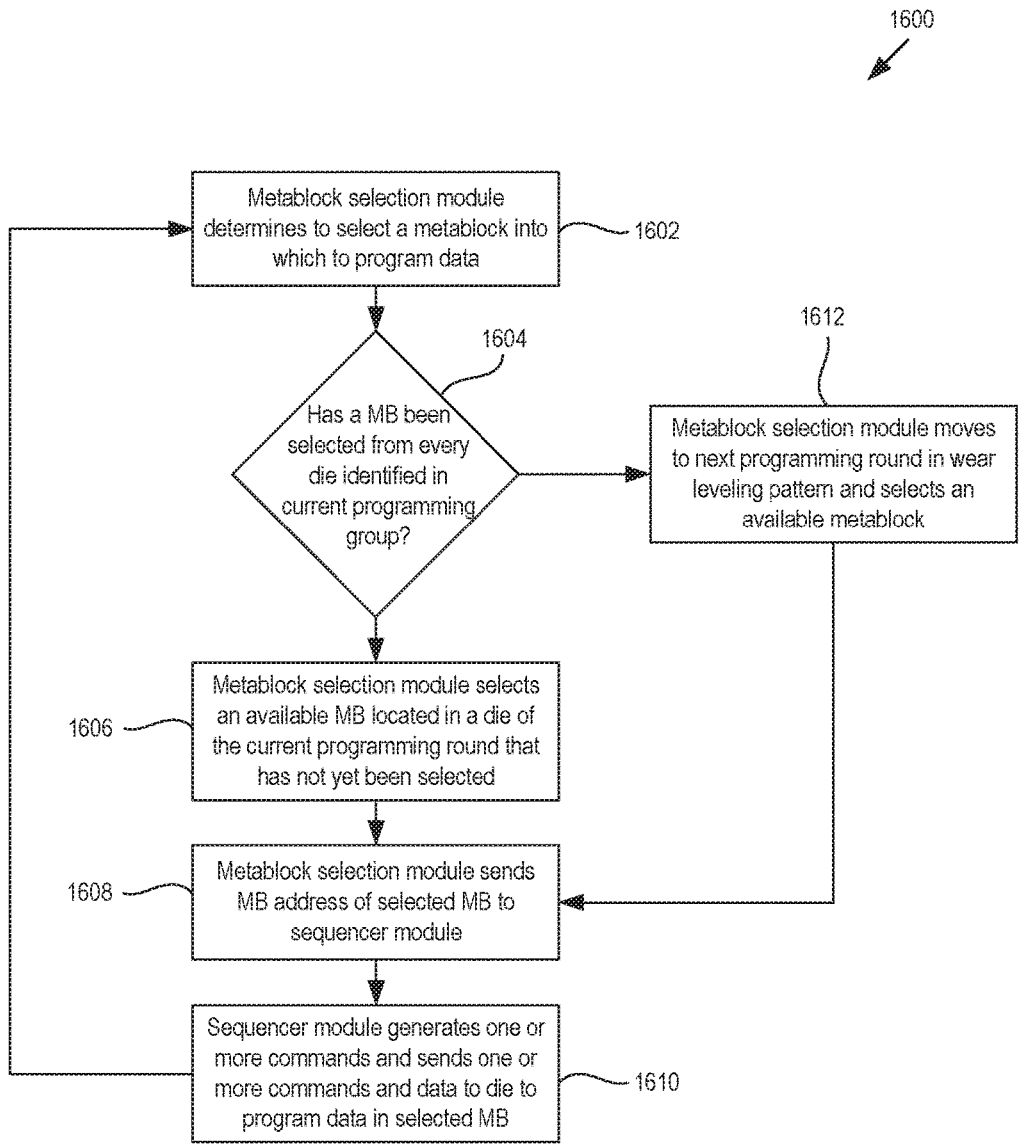
FIG. 16 is a flow chart of an example method of programming data across the plurality of memory dies of the non-volatile memory system of FIG. 1A according to a wear leveling pattern.

FIG. 16 shows a flow chart of an example method 1600 of programming data across a plurality of memory dies of a non-volatile memory system according to a wear leveling pattern, where at least two of the memory dies have different capacities (e.g., different numbers of blocks and/or different capacities/block), and where the wear leveling pattern identifies programming rounds, with the dies being identified in the programming rounds based on their capacities relative to each other, as explained above. The programming rounds in the pattern may be referred to as current programming round and next programming rounds. A current programming round in the wear leveling pattern may be the programming round in which a metablock selection module of the non-volatile memory system is currently using to select a metablock in which to program data. A next programming round in the wear leveling pattern may be the programming round that the metablock selection modules uses next to select one or more metablocks after the metablock selection module has selected a metablock located or spanning each of the memory dies identified in the current programming round.

At block 1602, the metablock selection module may determine to select a metablock into which to program data. To select a metablock, the metablock selection module may be configured to access a free block list that identifies metablocks that are available to store data. To select a metablock, at block 1604, the metablock selection module may determine whether it has selected a metablock located in or spanning each of the dies identified in a current programming round. If not, then at block 1606, the metablock selection module may select a metablock located in or spanning a die from which it has not yet selected. At block 1608, the metablock may provide a metablock address for the metablock it selected to a sequencer module. At block 1610, in response to receiving the metablock address, the sequencer module may generate one or more commands and send the one or more commands along with the data to be programmed to a die (or dies) in which the selected metablock is located. The method may proceed back to block 1602, where the metablock selection module may determine to select another metablock in which to program data. Referring back to block 1604, if a metablock has been selected from every die identified in the current programming round, then at block 1612, the metablock selection module may move to a next programming round of the wear leveling pattern and select a metablock located in or spanning a die identified in the next programming round. Upon moving to the next programming round, the metablock selection module may identify the next programming round as the current programming round for making its metablock selections. After selecting a metablock at block 1612, the example method 1600 may then proceed to 1608 and proceed as previously described.

Figure 17:
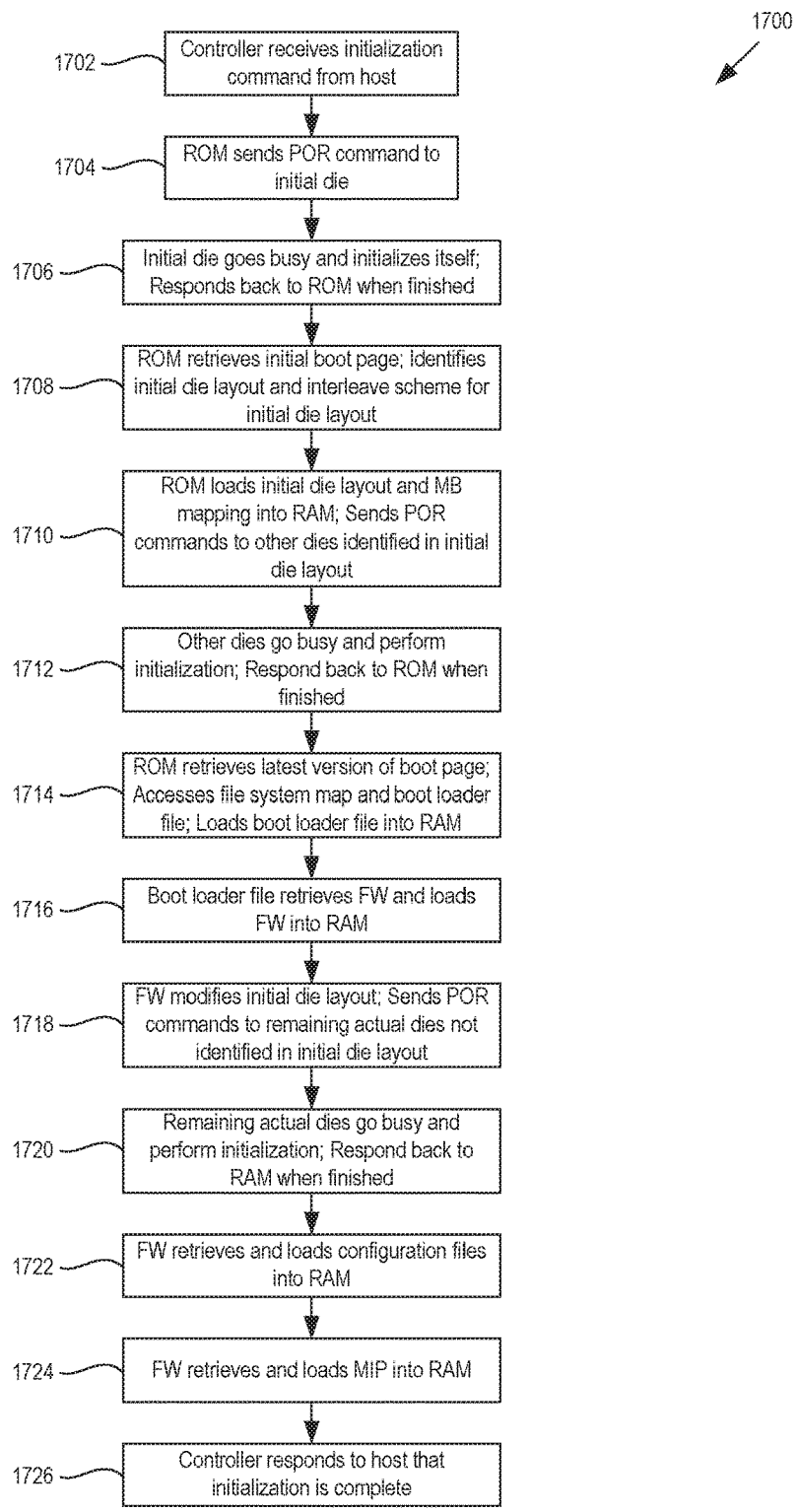
FIG. 17 is a flow chart of an example method of performing an initialization process for the non-volatile memory system of FIG. 1A.

FIG. 17 shows a flow chart of an example method 1700 of an initialization process of a non-volatile memory system that, upon completing the initialization process, includes a controller that identifies the system as including more memory dies than are actually present in the system. In addition, the memory dies that are actually present may be configured in a plurality of chip enable groups and at least one of the chip enable groups includes a maximum number of dies that are allowed to be uniquely identified under a die selection scheme employed by the controller, and at least one of the plurality of chip enable groups includes less than the maximum number.

At block 1702, the controller may receive an initialization command from a host that requests that the non-volatile memory system become initialized. At block 1704, a ROM module of the controller may send a power-on-rest (POR) command to an initial memory die that stores a boot page. The initial die may be a die that is configured in a chip enable group having the maximum number. The boot page may identify the number of chip enable groups having the maximum number and the number of memory dies in each of those chip enable groups. Since one of the chip enable groups does not have the maximum number, then the boot page may not identify all of the chip enable groups and all of the memory dies of the system. At block 1706, the initial memory die may receive the POR command an in response, may go busy and initialize itself. When it is finished, the initial memory die may respond back to the ROM module with a non-busy signal, indicating that it has finished initializing itself.

At block 1708, in response to receiving the non-busy signal, the ROM module may access the boot page stored in the initial memory die and identify the chip enable groups and number of dies in each of the chip enable groups identified in the boot page. In addition, the boot page may also identify an interleave scheme for the chip enable groups it identifies.

At block 1710, the ROM module may load a die layout into a RAM module of the controller. The die layout may correspond to the chip enable group and memory die information included in the boot page. In addition, the ROM module may load a metablock mapping for the die layout that corresponds to the interleave scheme identified in the boot page. Also, at block 1710, the ROM module may send POR commands to the dies other than the initial die that are identified in the boot page. At block 1712, in response to the POR commands, the other dies may go busy and in response, may initialize themselves. Also, each of the other dies may send non-busy signals back to the ROM module when they are finished.

At block 714, the ROM module may retrieve a latest version of a boot page to access a system file map, and upon review of the system file map, locate a boot loader file stored in one of the dies identified in the initial boot page accessed by the ROM module. In addition, at block 1714, the ROM module may load the boot loader file into the RAM module. At block 1716, the RAM module may execute the boot loader file to locate and retrieve firmware (or flashware) stored in one or more dies identified in the initial boot page.

At block 1718, upon executing the firmware, the RAM module may modify the initial layout to include one or more chip enable groups not identified in the initial boot page. The modified die layout may identify the additional one or more chip enable groups as including the same number of dies as the chip enable groups identified in the boot page. However, only some of the dies included in the additional chip enable groups may actually be physically present in the non-volatile memory system 100. In addition, at block 1718, upon executing the firmware, the RAM module may send POR commands to only those dies identified in the additional chip enable groups that are actually physically present in the system. These dies will not have previously received POR commands from the ROM module.

At block 1720, the dies receiving the POR commands from the RAM module may go busy, initialize themselves, and respond back to the RAM module when they are finished. At block 1722, the RAM module may access configuration files. At least one of these configuration files may include a bad block list that identifies unusable blocks. At least some of the blocks identified in the bad block list may be virtual blocks located in virtual dies and/or actual dies. Upon loading the bad block list, the RAM module may be prevented from adding corresponding metablocks to its free block list or otherwise attempt to program data to these blocks. At block 1724, the RAM module may access free block lists and update block address data structures stored in an address management block, and perform any address updating. At block 1724, the RAM module may determine that initialization is complete and respond back to the host indicating as such.

The above described example actual and virtual die layouts and related metablock addressing schemes and mappings, interleave schemes, wear leveling schemes and associated metablock selections, and initialization processes are described for a non-volatile memory system that includes thirteen actual memory dies configured into two chip enable groups, and where some embodiments of the thirteen die configuration includes a thirteenth die that has a different capacity and/or includes memory elements of a different NAND memory technology than the other twelve memory dies.

A particular implementation for the thirteen die configuration may be where each of the twelve dies is of a 128 Gb eX3 2P memory type, and the thirteenth die is of a 64 Gb eX3 2P memory type, where the term "128 Gb" indicates that the memory array of the die has a capacity of 128 Gigabits, the term "64 Gb" indicates that the memory array of the die has a capacity of 128 Gigabits, the term "eX3" indicates that the memory elements are programmed as TLC memory elements storing three-bits per cell, and the term "2P" indicates that each memory die includes two planes. This particular thirteen die configuration may be implemented in a micro-Secure Digital (microSD) memory card with a total capacity of 200 Gigabytes (GB). Other die configurations using other numbers of dies and/or using a different combination of 128 Gb and 64 Gb capacity dies may not fit within the packaging requirements of microSD cards as set forth by Secure Digital (SD) specifications and/or may fit but not provide as large of a total storage capacity. Virtual die layouts, metablock addressing schemes and mappings, interleave schemes, wear leveling schemes, and initialization processes as described above may be implemented for such a thirteen-die actual die layout.

However, similar virtual die layouts, metablock addressing schemes and mappings, interleave schemes, wear leveling schemes, and/or initialization processes may be implemented for other actual die layouts where one or both of the following conditions occur: (1) the non-volatile memory system includes a plurality chip enable groups and at least one of the chip enable groups does not include a maximum number of dies that are allowed to be uniquely identified under a die selection scheme employed by the controller; and/or (2) the non-volatile memory system includes one or more chip enable groups, and at least two dies include memory arrays of different types or technologies.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

We claim:

1. A non-volatile memory system comprising:
  non-volatile memory comprising a plurality of physically present memory dies configured in a plurality of chip enable groups comprising a first chip enable group and a second enable group, wherein a die selection scheme of the non-volatile memory system identifies a maximum number of memory dies that are allowed to be uniquely identified in a single chip enable group, wherein the first chip enable group comprises a first number of physically present memory dies that is less than the maximum number and the second chip enable group comprises a second number of physically present memory dies that is equal to the maximum number of memory dies; and a controller in communication with the non-volatile memory, wherein the controller is configured to:
  select the plurality of physically present memory dies for communication according to the die selection scheme;
  perform an initialization process to identify memory dies of the first and second chip enable groups; and
  in response to completion of the initialization process:
    maintain a virtual die layout that identifies the first chip enable group as comprising the first number of physically present memory dies and at least one virtual die that is not physically present in the non-volatile memory such that the virtual die layout identifies both the first chip enable group and the second chip enable group as comprising the maximum number of memory dies allowed to be uniquely identified under the die selection scheme; and
    maintain an address mapping that maps addresses to storage locations of the non-volatile memory according to the virtual die layout.

2. The non-volatile memory system of claim 1, wherein the controller comprises a read-only memory (ROM) module configured to:
  during the initialization process, access a boot page stored in the second chip enable group, wherein the boot page identifies the non-volatile memory as including the second chip enable group and not the first chip enable group.

3. The non-volatile memory of claim 2, wherein during the initialization process the ROM module is further configured to:
  send an initialization command to an initial physically present memory die configured in the second chip enable group, wherein the initial physically present memory die stores the boot page;
  access the boot page upon the initial physically present memory die being initialized; and
  in response to access of the boot page, send initialization commands to physically present memory dies configured in the second chip enable group other than the initial physically present memory die, and not to physically present memory dies configured in the first chip enable group.

4. The non-volatile memory system of claim 2, wherein the controller further comprises a random access memory (RAM) module, wherein during the initialization process:
  the ROM module is further configured to provide, to the RAM module, a die layout that identifies the second chip enable group and not the first chip enable group, and wherein during the initialization process, the RAM module is configured to:
  retrieve firmware stored in the non-volatile memory; and
  in response to retrieval of the firmware, modify the die layout to generate the virtual die layout.

5. The non-volatile memory system of claim 4, wherein during the initialization process the RAM module is further configured to:
  further in response to retrieval of the firmware, send initialization commands to physically present memory dies configured in the first chip enable group.

6. The non-volatile memory system of claim 1, wherein the address mapping comprises a first address mapping, and wherein the controller is further configured to maintain a second address mapping that maps addresses to storage locations of the non-volatile memory according to a die layout that identifies the second chip enable group and not the first chip enable group.

7. The non-volatile memory system of claim 6, wherein the controller uses the second address mapping to address files accessed by the controller during the initialization process.

8. The non-volatile memory system of claim 1, wherein the controller uses the address mapping to address data stored in the non-volatile memory in response to a host write request.

9. The non-volatile memory system of claim 1, wherein the controller is configured to identify virtual storage locations of the at least one virtual die as being physically present in the non-volatile memory but unusable.

10. The non-volatile memory system of claim 1, wherein the virtual die layout further identifies virtual storage locations located in a physically present memory die of the plurality of physically present memory dies.

11. The non-volatile memory system of claim 1, wherein sizes of the storage locations to which the addresses are mapped under the address mapping are determined based on an interleave scheme employed by the controller, wherein the interleave scheme determines the sizes such that the storage locations do not include both a physically present portion and a virtual portion.

12. The non-volatile memory system of claim 1, wherein the number of dies in the chip enable group is even.

13. The non-volatile memory system of claim 1, wherein the number of dies in the chip enable group is odd.

14. A method of performing an initialization process of a non-volatile memory system comprising non-volatile memory, the non-volatile memory comprising a plurality of physically present memory dies, the method comprising:
  receiving, with a controller of the non-volatile memory system, an initialization command from a host system;
  in response to receiving the initialization command, initializing, with a read-only memory (ROM) module of the controller, an initial set of the physically present memory dies, wherein a number of physically present memory dies of the first set is less than a total number of the physically present memory dies;
  generating, with the ROM module, a data structure that identifies the initial set of the physically present memory dies;
  in response to the ROM module initializing the initial set of physically present memory dies, retrieving, with a random access memory (RAM) module of the controller, firmware stored in the non-volatile memory that causes the RAM module to identify a remaining set of the physically present memory dies; and
  in response to retrieving the firmware:
    initializing, with the RAM module, the remaining set of the physically present memory dies; and
    modifying the data structure to identify the remaining set of the physically present memory dies.

15. The method of claim 14, wherein initializing the initial set of physically present memory dies comprises:

initializing, with the ROM module, an initial memory die storing a boot page that identifies the initial set of memory dies;

retrieving, with the ROM module, the boot page from the initial memory die after initializing the initial memory die;

in response to retrieving the boot page, initializing, with the ROM module, remaining memory dies of the initial set.

16. The method of claim 14, wherein the initial set of memory dies is configured in a first chip enable group, wherein the remaining set of memory dies is configured in a second chip enable group, and wherein a number of dies in the remaining set less than a maximum number of memory dies allowed to be uniquely identified under a die selection scheme employed by the controller.

17. A non-volatile memory system comprising:

non-volatile memory comprising a plurality of memory dies, wherein each memory die of the plurality of memory dies has an associated capacity; and a controller configured to perform write operations across the plurality of memory dies according to a wear leveling scheme that is based on capacity ratios associated with the plurality of memory dies, wherein each capacity ratio comprises a ratio of a capacity of an associated one of the plurality of memory dies to a largest capacity among the plurality of memory dies, and wherein among the capacity ratios, a first capacity ratio associated with at least one first memory die of the plurality of memory dies is less than a second capacity ratio associated with at least one second memory die of the plurality of memory dies.

18. The non-volatile memory system of claim 17, wherein the wear leveling pattern comprises a plurality of programming rounds, wherein each of the programming rounds identifies at least one of the plurality of memory dies, wherein the plurality of memory dies are identified in each of the plurality of programming rounds based on the associated capacity ratios, wherein under a single iteration of the wear leveling pattern, the controller is configured to perform one of the write operations on each of the memory dies identified in each of the plurality of programming rounds.

19. The non-volatile memory system of claim 18, wherein under the wear leveling pattern, the controller is further configured to perform a write operation on each of the memory dies identified in one of the plurality of programming rounds before performing a write operation on a memory die identified in another of the plurality of programming rounds.

20. The non-volatile memory system of claim 17, wherein the controller is configured to maintain a first address data structure that associates first logical addresses with first physical addresses mapped to first storage locations of the at least one first memory die and a second data structure that associates second logical addresses with second physical addresses mapped to second storage locations of the at least one second memory die, wherein a size associated with the first storage locations is different than a size associated with the second storage locations.

21. The non-volatile memory system of claim 20, wherein the size associated with the first storage locations is smaller than the size associated with the second storage locations.

22. The non-volatile memory system of claim 21, wherein a size per block for the at least one first memory die is smaller than a size per block for the at least one second memory die.

* * * * *